US009838891B2

(12) United States Patent
Willig et al.

(10) Patent No.: US 9,838,891 B2
(45) Date of Patent: *Dec. 5, 2017

(54) APPARATUS AND METHOD FOR ASSESSMENT OF MESH NETWORK TOPOLOGY

(71) Applicant: ENERNOC, INC., Boston, MA (US)

(72) Inventors: Randy C. Willig, Fort Collins, CO (US); Morgan Jones, Longmont, CO (US)

(73) Assignee: ENERNOC, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,098

(22) Filed: Dec. 30, 2015

(65) Prior Publication Data

US 2016/0119802 A1  Apr. 28, 2016

Related U.S. Application Data

(63) Continuation of application No. 14/791,094, filed on Jul. 2, 2015, which is a continuation of application
(Continued)

(51) Int. Cl.
*H04L 12/28* (2006.01)
*H04W 24/06* (2009.01)
(Continued)

(52) U.S. Cl.
CPC ............ *H04W 24/06* (2013.01); *G01D 4/002* (2013.01); *G08C 15/02* (2013.01); *H04B 1/7156* (2013.01);
(Continued)

(58) Field of Classification Search
CPC ..... H04W 24/06; H04W 84/18; H04W 4/008; H04L 41/12; H04L 63/06; H04L 63/10
(Continued)

(56) References Cited

U.S. PATENT DOCUMENTS 4,023,043 A   5/1977   Stevenson
4,804,957 A   2/1989   Selph et al.
(Continued)

OTHER PUBLICATIONS

Barker, Sean et al. "SmartCap: Flattening Peak Electricity Demand in Smart Homes." 2012 IEEE International Conference on Pervasive Computing and Communications, Lugano (Mar. 19-23, 2012) pp. 67-75.
(Continued)

*Primary Examiner* — Faisal Choudhury
(74) *Attorney, Agent, or Firm* — Richard K. Huffman

(57) ABSTRACT

A mesh network topology assessment mechanism is provided including a plurality of first wireless routers, coupled together over a multi-hop mesh network, and a second wireless router. The second wireless router is coupled to the first wireless routers and, responsive to a message having a link assessment mode, introduces a unique delay into forwarding of the message to a next one of the plurality of first wireless routers in route to a destination device. The second wireless router has a store-and-forward controller, having a unique delay time corresponding to the unique delay, where the unique delay time is substantial and thus provides for creation of measurable latency in the message sent between an origination device and the destination device.

5 Claims, 19 Drawing Sheets

Related U.S. Application Data

No. 13/617,782, filed on Sep. 14, 2012, now Pat. No. 9,082,294.

(60) Provisional application No. 61/534,503, filed on Sep. 14, 2011.

(51) Int. Cl.

| G08C 15/02 | (2006.01) |
|---|---|
| H04L 12/24 | (2006.01) |
| H04B 1/7156 | (2011.01) |
| H04W 12/08 | (2009.01) |
| H04Q 9/00 | (2006.01) |
| G01D 4/00 | (2006.01) |
| H04W 24/08 | (2009.01) |
| H04L 29/06 | (2006.01) |
| H04W 4/00 | (2009.01) |
| H04W 84/18 | (2009.01) |

(52) U.S. Cl.
CPC .............. *H04L 41/12* (2013.01); *H04L 63/06* (2013.01); *H04L 63/10* (2013.01); *H04Q 9/00* (2013.01); *H04W 4/008* (2013.01); *H04W 12/08* (2013.01); *H04W 24/08* (2013.01); H04B 2001/71563 (2013.01); H04Q 2209/43 (2013.01); H04Q 2209/50 (2013.01); H04Q 2209/60 (2013.01); H04W 84/18 (2013.01)

(58) Field of Classification Search
USPC .................................................. 370/329, 254
See application file for complete search history.

(56) References Cited

U.S. PATENT DOCUMENTS

| 5,274,571 | A | 12/1993 | Hesse et al. |
|---|---|---|---|
| 5,815,811 | A | 9/1998 | Pinard et al. |
| 5,897,607 | A | 4/1999 | Jenney et al. |
| 6,437,743 | B1 | 8/2002 | Mintz et al. |
| 6,512,737 | B1 | 1/2003 | Agee |
| 7,102,533 | B2 | 9/2006 | Kim |
| 7,177,728 | B2 | 2/2007 | Gardner |
| 7,376,122 | B2 | 5/2008 | Draves, Jr. et al. |
| 7,379,997 | B2 | 5/2008 | Ehlers et al. |
| 7,495,578 | B2 | 2/2009 | Borleske |
| 7,580,775 | B2 | 8/2009 | Kulyk et al. |
| 7,715,951 | B2 | 5/2010 | Forbes, Jr. et al. |
| 7,769,149 | B2 | 8/2010 | Berkman |
| 7,783,390 | B2 | 8/2010 | Miller |
| 7,894,946 | B2 | 2/2011 | Kuylyk et al. |
| 7,949,615 | B2 | 5/2011 | Ehlers et al. |
| 7,992,630 | B2 | 8/2011 | Springer et al. |
| 8,041,467 | B2 | 10/2011 | Black et al. |
| 8,078,330 | B2 | 12/2011 | Brickfield et al. |
| 8,180,328 | B2 | 5/2012 | Van De Groenendaal |
| 8,185,245 | B2 | 5/2012 | Amundson et al. |
| 8,367,984 | B2 | 2/2013 | Besore et al. |
| 8,457,803 | B2 | 6/2013 | Willig et al. |
| 2002/0186167 | A1 | 12/2002 | Anderson |
| 2003/0112753 | A1* | 6/2003 | Jo .......................... H04L 45/00 370/229 |
| 2004/0139038 | A1 | 7/2004 | Ehlers et al. |
| 2004/0150510 | A1 | 8/2004 | Taka et al. |
| 2005/0055432 | A1 | 3/2005 | Rodgers |
| 2005/0073992 | A1 | 4/2005 | Lee et al. |
| 2005/0078631 | A1 | 4/2005 | Cornwall |
| 2005/0192713 | A1 | 9/2005 | Weik et al. |
| 2005/0282570 | A1 | 12/2005 | Pulkkinen et al. |
| 2006/0072694 | A1 | 4/2006 | Dai et al. |
| 2006/0104205 | A1 | 5/2006 | Strutt et al. |
| 2006/0135121 | A1 | 6/2006 | Abedi et al. |
| 2007/0005193 | A1 | 1/2007 | Nelson et al. |
| 2007/0013547 | A1 | 1/2007 | Boaz |
| 2007/0019552 | A1* | 1/2007 | Senarath ................ H04L 47/10 370/235 |
| 2007/0060132 | A1 | 3/2007 | Wilhelmsson et al. |
| 2007/0099624 | A1 | 5/2007 | Guo |
| 2007/0211687 | A1 | 9/2007 | Benjebbour et al. |
| 2007/0255461 | A1 | 11/2007 | Brickfield et al. |
| 2008/0012724 | A1 | 1/2008 | Corcoran et al. |
| 2008/0013502 | A1 | 1/2008 | Clark |
| 2008/0125069 | A1 | 5/2008 | Davis et al. |
| 2008/0192724 | A1 | 8/2008 | Kondo et al. |
| 2008/0205292 | A1 | 8/2008 | Denby et al. |
| 2008/0225737 | A1 | 9/2008 | Gong et al. |
| 2008/0267259 | A1 | 10/2008 | Budampati et al. |
| 2009/0005029 | A1 | 1/2009 | Wang et al. |
| 2009/0102680 | A1 | 4/2009 | Roos |
| 2009/0167558 | A1 | 7/2009 | Borleske et al. |
| 2009/0185542 | A1 | 7/2009 | Zhang et al. |
| 2009/0325566 | A1 | 12/2009 | Bell et al. |
| 2010/0039263 | A1 | 2/2010 | Chen et al. |
| 2010/0088261 | A1 | 4/2010 | Montalvo |
| 2010/0156632 | A1 | 6/2010 | Hyland et al. |
| 2010/0217450 | A1 | 8/2010 | Beal et al. |
| 2010/0217550 | A1 | 8/2010 | Crabtree et al. |
| 2010/0217651 | A1 | 8/2010 | Crabtree et al. |
| 2010/0278187 | A1 | 11/2010 | Hart et al. |
| 2010/0328097 | A1 | 12/2010 | Leo et al. |
| 2011/0013586 | A1 | 1/2011 | Oh et al. |
| 2011/0035073 | A1 | 2/2011 | Ozog |
| 2011/0037612 | A1 | 2/2011 | Cornwall |
| 2011/0063126 | A1 | 3/2011 | Kennedy et al. |
| 2011/0196513 | A1 | 8/2011 | Willig et al. |
| 2011/0280178 | A1 | 11/2011 | Heifner |
| 2011/0282504 | A1 | 11/2011 | Besore et al. |
| 2011/0286505 | A1 | 11/2011 | Hedley et al. |
| 2012/0019395 | A1 | 1/2012 | Willig et al. |
| 2012/0113868 | A1 | 5/2012 | Cummings |
| 2012/0232701 | A1 | 9/2012 | Carty et al. |
| 2012/0253527 | A1 | 10/2012 | Hietala et al. |
| 2012/0320768 | A1* | 12/2012 | Shaffer ................. H04W 40/16 370/252 |
| 2013/0024710 | A1 | 1/2013 | Jackson |
| 2013/0181847 | A1 | 7/2013 | Willig et al. |
| 2013/0185437 | A1 | 7/2013 | Willig et al. |
| 2013/0195036 | A1 | 8/2013 | Quan et al. |
| 2013/0297091 | A1 | 11/2013 | Willig et al. |
| 2013/0297092 | A1 | 11/2013 | Willig et al. |
| 2013/0304273 | A1 | 11/2013 | Willig et al. |
| 2015/0074282 | A1 | 3/2015 | Willig |
| 2015/0081052 | A1 | 3/2015 | Willig |
| 2015/0081053 | A1 | 3/2015 | Willig |
| 2015/0081105 | A1 | 3/2015 | Willig et al. |
| 2015/0081128 | A1 | 3/2015 | Willig |
| 2015/0081915 | A1 | 3/2015 | Willig |
| 2015/0088328 | A1 | 3/2015 | Willig |
| 2015/0227151 | A1 | 8/2015 | Willig et al. |
| 2015/0227152 | A1 | 8/2015 | Willig et al. |
| 2015/0227153 | A1 | 8/2015 | Willig et al. |
| 2015/0292902 | A1 | 10/2015 | Willig et al. |
| 2015/0292903 | A1 | 10/2015 | Willig et al. |
| 2015/0294557 | A1 | 10/2015 | Willig et al. |
| 2015/0304871 | A1 | 10/2015 | Willig et al. |
| 2015/0326276 | A1 | 11/2015 | Willig |
| 2015/0327089 | A1 | 11/2015 | Willig et al. |
| 2015/0341793 | A1 | 11/2015 | Willig |

OTHER PUBLICATIONS

Irwin, David et al. "Exploiting Home Automation Protocols for Load Monitoring in Smart Buildings." Proceedings of the Third ACM Workshop on Embedded Sensing Systems for Energy-Efficiency in Buildings, Buildsys '11. Jan. 11, 2011. pp. 7-12.

\* cited by examiner

*PRESENT DAY AUTOMATIC METER READING TECHNIQUE*

*PRESENT DAY AUTOMATIC METERING INFRASTRUCTURE*

WIRELESS SLAVE NETWORK MECHANISM

WIRELESS MASTER INTERFACE MECHANISM

APPARATUS FOR LARGE PAYLOAD FRAGMENTATION AND SIMULTANEOUS TRANSMISSION

APPARATUS AND METHOD FOR ASSESSMENT OF MESH NETWORK TOPOLOGY

CROSS-REFERENCE TO RELATED APPLICATIONS

This application is a continuation of the following U.S. Nonprovisional patent application, which is herein incorporated by reference for all intents and purposes.

| SERIAL NUMBER | FILING DATE | TITLE |
| --- | --- | --- |
| 14/791,094 (ENER.0106-C4) | Jul. 2, 2015 | MESH NETWORK TOPOLOGY ASSESSMENT MECHANISM |

This application is related to the following co-pending U.S. Nonprovisional patent applications.

| SERIAL NUMBER | FILING DATE | TITLE |
| --- | --- | --- |
| 13/025,142 (ENER.0101) | Feb. 10, 2011 | APPARATUS AND METHOD FOR DEMAND COORDINATION NETWORK |
| 13/864,933 (ENER.0101-C1) | Apr. 17, 2013 | DEMAND COORDINATION NETWORK CONTROL NODE |
| 13/864,942 (ENER.0101-C2) | Apr. 17, 2013 | APPARATUS AND METHOD FOR CONTROLLING PEAK ENERGY DEMAND |
| 13/864,954 (ENER.0101-C3) | Apr. 17, 2013 | CONFIGURABLE DEMAND MANAGEMENT SYSTEM |
| 13/601,622 (ENER.0105) | Aug. 31, 2012 | NOC-ORIENTED CONTROL OF A DEMAND COORDINATION NETWORK |
| 14/547,919 (ENER.0105-C1) | Nov. 19, 2014 | NETWORK LATENCY TOLERANT CONTROL OF A DEMAND COORDINATION NETWORK |
| 14/547,962 (ENER.0105-C2) | Nov. 19, 2014 | APPARATUS AND METHOD FOR PASSIVE MODELING OF NON-SYSTEM DEVICES IN A DEMAND COORDINATION NETWORK |
| 14/547,992 (ENER.0105-C3) | Nov. 19, 2014 | APPARATUS AND METHOD FOR ACTIVE MODELING OF NON-SYSTEM DEVICES IN A DEMAND COORDINATION NETWORK |
| 14/548,023 (ENER.0105-C4) | Nov. 19, 2014 | APPARATUS AND METHOD FOR EVALUATING EQUIPMENT OPERATION IN A DEMAND COORDINATION NETWORK |
| 14/548,057 (ENER.0105-C5) | Nov. 19, 2014 | APPARATUS AND METHOD FOR ANALYZING NORMAL FACILITY OPERATION IN A DEMAND COORDINATION NETWORK |
| 14/548,097 (ENER.0105-C6) | Nov. 19, 2014 | APPARATUS AND METHOD FOR MANAGING COMFORT IN A DEMAND COORDINATION NETWORK |
| 14/548,107 (ENER.0105-C7) | Nov. 19, 2014 | DEMAND COORDINATION SYNTHESIS SYSTEM |
| 14/691,858 (ENER.0105-C8) | Apr. 21, 2015 | NOC-ORIENTED DEMAND COORDINATION NETWORK CONTROL NODE |
| 14691907 (ENER.0105-C9) | Apr. 21, 2015 | NOC-ORIENTED APPARATUS AND METHOD FOR CONTROLLING PEAK ENERGY DEMAND |
| 14691945 (ENER.0105-C10) | Apr. 21, 2015 | CONFIGURABLE NOC-ORIENTED DEMAND MANAGEMENT SYSTEM |
| 14/729,907 (ENER.0106-C1) | Jun. 3, 2015 | APPARATUS AND METHOD FOR RECEIVING AND TRANSPORTING REAL TIME AMR METER DATA |
| 14/729,963 (ENER.0106-C2) | Jun. 3, 2015 | REAL TIME ENERGY DATA TRANSPORT MECHANISM |
| 14/730,007 (ENER.0106-C3) | Jun. 3, 2015 | LOW-COST REAL TIME ENERGY DATA TRANSPORT APPARATUS AND METHOD |
| 14791133 (ENER.0106-C5) | Jul. 2, 2015 | APPARATUS AND METHOD FOR END-TO-END LINK QUALITY INDICATION |
| 14791149 (ENER.0106-C6) | Jul. 2, 2015 | FREQUENCY HOP SEQUENCE DISCOVERY MECHANISM |
| 14/816,363 (ENER.0106-C7) | Aug. 3, 2015 | APPARATUS AND METHOD FOR PROXIMITY BASED WIRELESS SECURITY |
| (ENER.0106-C9) | | PROXIMITY BASED WIRELESS SECURITY SYSTEM |

BACKGROUND OF THE INVENTION

Field of the Invention

This invention relates in general to the field of automated resource control, and more particularly to a topology assessment mechanism for deploying and maintaining wireless networks.

Description of the Related Art

Since late in the 1800's, electrical power, natural gas, and water providers have been distributing these resources to consumers. And not long after larger distribution grids were deployed by these utilities, the problem of billing based upon consumption arose. Consequently, utilities began to install consumption meters for these resources at their respective points of consumption.

Accordingly, virtually everyone in this country and many countries abroad understand the role of the "meter reader," for early utility meters provided only a visual indication of how much certain resource had been consumed over a billing period. Thus, in order for a resource provider to determine the amount of that resource which had been consumed over a billing period, it was necessary to dispatch personnel each time a meter reading was required. This typically occurred on a monthly basis.

This manner of obtaining usage data, however, was labor intensive and consequently very costly. In addition, because the act of reading a meter involved interpretation of the meaning of one or more visual indicators (typically analog indicators like the hands on a watch), these readings were subject to inaccuracies due to errors made by the meter readers.

In the past twenty years, developers have begun to address the problems of labor cost and inaccurate readings due to the human element by providing so-called automatic meter reading (AMR) meters, the most prevalent type of which broadcast their current values in a known and encoded low power radio frequency transmission capable of being captured by a corresponding AMR receiver in a moving vehicle. Hence, AMR technologies substantially alleviate the limitations of former meters related to accurate readings and markedly addressed the cost of labor required to read meters.

But in order to deploy AMR products, the resource providers had to completely replace their existing inventory of meters—literally hundreds of millions of meters—at substantial expense, the bulk of which was conveyed either directly or indirectly to consumers.

In the past ten years, developers have responded to demands in the art for so-called "smart meters," that is, meters that allow for two-way communication between a resource provider and a point of consumption. Two-way communications between a provider and a meter, also known as automated metering infrastructure (AMI) yields several benefits to the provider because with AMI the provider is no longer required to send out personnel to control consumption at an access point. With AMI meters, a utility can turn on and turn off consumption of the resource at the consumption point without sending out service personnel. And what is more attractive from a provider standpoint is that AMI techniques can be employed to perform more complex resource control operations such as demand response control.

The present inventors have observed, however, that to provide for AMI, under present day conditions, requires that the utilities—yet one more time—replace their entire inventory of AMR meters with more capable, and significantly more expensive, AMI meters. In addition, present day approaches that are directed toward providing the two-way communications between the utilities and their fleet of AMI meters all require the development of entirely new communications infrastructures (e.g., Wi-Fi, satellite) or they are bandwidth limited (e.g., cellular).

Consequently, what is required is an apparatus and method for providing AMI capabilities to existing AMR meters without a requirement to entirely replace or significantly modify the existing AMR meters.

In addition, what is required is a mechanism for deploying an AMI grid that minimizes the cost of metering and two-way communications upgrades.

Furthermore, what is needed is a smart grid technique that employs existing AMR meters and moreover leverages already deployed high bandwidth two-way communications infrastructures.

Moreover, what is needed is a cost-effective mechanism for reading existing AMR meter grids.

Further, what is needed is a technique that supports the deployment of wireless devices in a manner that security provisions are tailored according to proximity.

Also, what is needed is a topology assessment mechanism for deploying and maintaining wireless networks.

In addition, what is needed is a technique that allows end-to-end link quality in a wireless network to be easily quantified.

Furthermore, what is needed is a method for discovering a frequency hopping sequence in a system of devices such as AMR meters.

Moreover, what is needed is a large payload fragmentation scheme for use by a network of wireless devices.

Also, what is needed is a mechanism whereby a mesh network of wireless devices may optimally select bands/channels for transmission of messages to other devices in the network.

SUMMARY OF THE INVENTION

The present invention, among other applications, is directed to solving the above-noted problems and addresses other problems, disadvantages, and limitations of the prior art. The present invention provides a superior technique for assessing the topology and latency of a wireless mesh network. In one embodiment, a mesh network topology assessment mechanism is provided. The mechanism includes a plurality of first wireless routers and a second wireless router. The plurality of first wireless routers is coupled together over a multi-hop mesh network. The second wireless router is coupled to the plurality of first wireless routers over the multi-hop mesh network and, responsive to a message having a link assessment mode, is configured to introduce a unique delay into forwarding of the message to a next one of the other wireless routers in route to a destination device. The second wireless router has a store-and-forward controller, having a unique delay time corresponding to the unique delay, where the unique delay time is substantial and thus provides for creation of measurable latency in the message sent between an origination device and the destination device.

In one aspect the present invention contemplates a mesh network topology assessment mechanism. The mechanism has a first wireless router, a second wireless router, and a third wireless router. The first wireless router is coupled to a multi-hop mesh network. Responsive to a message from a source device having a link assessment mode, the first router introduces a first delay into forwarding of the message in route to a destination device. The first router includes a first store-and-forward controller, having a first delay time corresponding to the first delay, where the first delay time is substantial and thus provides for creation of measurable latency in forwarding of the message. The second wireless router receives the message forwarded from the first wireless router, and introduces a second delay into forwarding of the message in route to the destination device. The second router includes a second store-and-forward controller, having a second delay time corresponding to the second delay, where the second delay time is substantial thus providing for creation of measurable latency in forwarding of the message, where the first and second delay times are unique. The third wireless router receives the message forwarded from the second wireless router, and introduces a third delay into forwarding of the message in route to the destination device. The third wireless router includes a third store-and-forward controller, having a third delay time corresponding to the third delay, where the third delay time is substantial thus providing for creation of measurable latency in forwarding of the message, where the first and second delay times are unique.

Another aspect of the present invention comprehends a method for assessing a topology of a mesh network. The method includes first coupling a plurality of wireless routers together over a multi-hop mesh network; second coupling a second wireless router to the plurality of first wireless routers over the multi-hop mesh network; and responsive to a message having a link assessment mode, via the second wireless router, introducing a unique delay into forwarding of the message to a next one of the plurality of first wireless routers in route to a destination device, where the second wireless router has a unique delay time corresponding to the unique delay, and where the unique delay time is substantial and thus provides for creation of measurable latency in the message sent between an origination device and the destination device.

BRIEF DESCRIPTION OF THE DRAWINGS

These and other objects, features, and advantages of the present invention will become better understood with regard to the following description, and accompanying drawings where.

DETAILED DESCRIPTION

Figure 1:
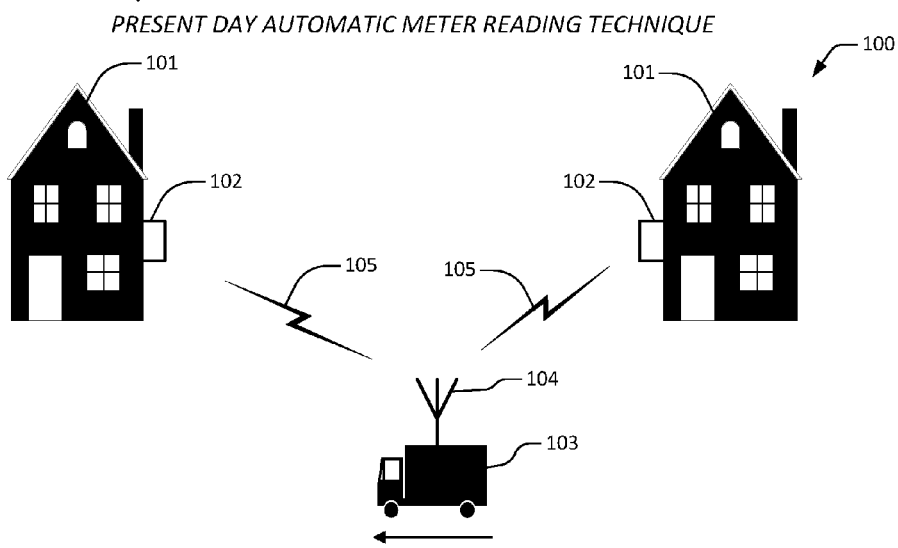
FIG. 1 is a block diagram illustrating a present day automatic meter reading technique.

Exemplary and illustrative embodiments of the invention are described below. In the interest of clarity, not all features of an actual implementation are described in this specification, for those skilled in the art will appreciate that in the development of any such actual embodiment, numerous implementation-specific decisions are made to achieve specific goals, such as compliance with system related and/or business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
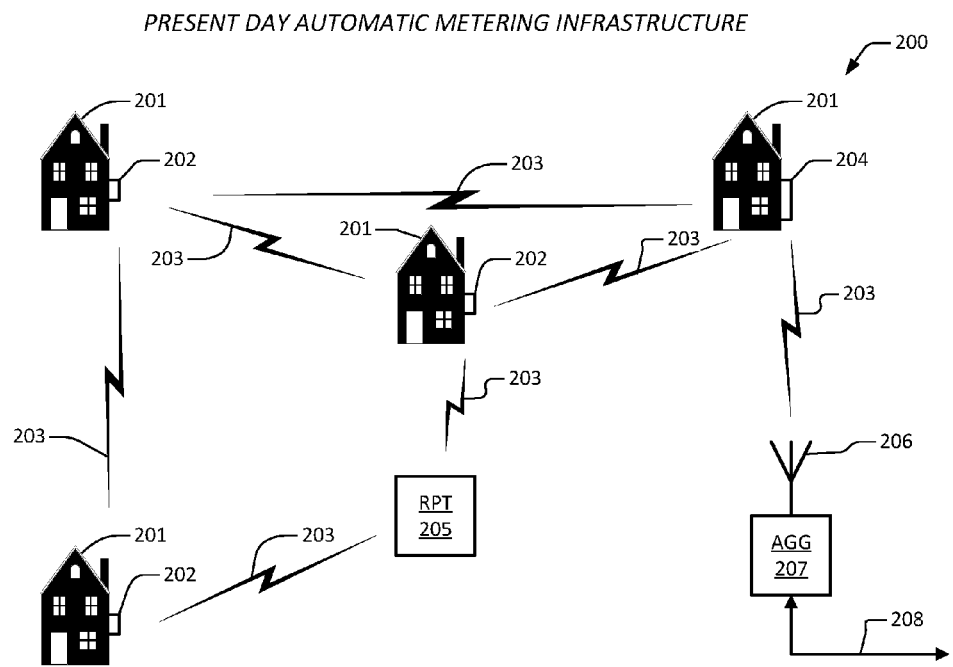
FIG. 2 is a block diagram depicting a present day automatic metering infrastructure.

In view of the above background discussion on automatic meter reading and associated techniques employed by present day resource providers to obtain meter readings from resource consumers, a discussion of the limitations and disadvantages of these techniques will now be presented with reference to FIGS. 1-2. Following this, a discussion of the present invention will be provided with reference to FIGS. 3-22. The present invention overcomes the noted limitations and disadvantages of present day automatic meter reading mechanisms by providing apparatus and methods that enable cost effective reception and transport of real time usage data over an existing communications infrastructure without requiring replacement of existing meters, thereby providing for the elimination of fleet assets associated with obtaining usage data, providing continuous and more reliable communications, and obtaining maximum benefit from previous capital outlays.

Turning to FIG. 1, a block diagram 100 is presented illustrating a present day automatic meter reading technique. The diagram 100 shows exemplary structures 101 that employ a consumable resource that is produced or provided by a resource provider. Coupled to each of the structures 101 is a corresponding resource meter 102 that is configured to measure usage of the resource over a particular time period for purposes of billing consumers associated with the structures 101. As such, the meters 102 are certified to provide billing grade data. That is, their accuracy and sampling frequencies of resource consumption are adequate for billing purposes, but are not fast enough to allow for analysis of how a particular structure 101 may utilize the resource over a shorter period of time. The meters 102 are operationally coupled to the resource itself and perform measurements commensurate with the billing requirements of the resource provider. It is noted that presently such meters 102 exist to measure consumption of electrical power (electricity), natural gas, and water, but the present inventors note that the discussion of the present invention hereinafter is not to be constrained to the aforementioned resources. Rather, the present invention contemplates measurement and control of any conceivable and measurable resource such as, but not limited to, air, any form of gaseous substance, nuclear power, liquid resources, solid resources, and the like, which may benefit from metered measurement, reporting, and control. Hereinafter, since meters 102 of the sort noted above are most prevalently employed within the electrical power field, the following examples will be discussed in terms well known to those conversant in the areas of electrical power generation, distribution, and consumption. Yet, it is noted that such terminology is employed only as a convenient vehicle to clearly teach aspects of the present invention and the present invention should not be restricted in scope in any way to specific application within the electrical power field.

Older meters (not shown) provided some form of visual indication of electrical power consumption, and personnel (i.e., meter readers) were dispatched typically monthly to each building within an electrical power provider's service area (i.e., grid) to manually obtain readings associated therewith. This approach was naturally labor intensive and thus expensive. In addition, because the accuracy of the data obtained depended on human factors, such an approach was subject to error.

Many electrical power providers today utilize automatic meter reading meters 102 that periodically broadcast their respective readings over relatively secure wireless communication links 105. A significant number of AMR meters 102 today employ an encoded receiver transmitter (ERT) technique to broadcast encoded meter readings over the communication links 105. To obtain these readings, the electrical power provider typically dispatches a vehicle 103 that is equipped with an antenna 104 and associated receiver (not shown) that is configured to automatically receive, identify, and store the readings from each of the meters 102. ERT is a low power wideband (i.e., frequency hopping) radio frequency (RF) technique that is widely used for automatic meter reading, but it still requires the dispatch of personnel and equipment in order to gather consumption data from the AMR meters 102. Accordingly, while the accuracy of data obtained through the use of AMR meters 102 is improved over manual approaches, gathering of consumption data is still costly because of the personnel and equipment that are still required to do so. Moreover, AMR meters 102 are one-way communication devices and are thus incapable of serving as a control mechanism responsive to a resource provider's requirements. For example, in order to cut off power to a particular building 101, the provider must dispatch service personnel who manually cut off the power to the particular building 101. Thus, it is impossible for AMR meters 102 to be employed in more sophisticated resource provider programs such as demand response control and the like in any way that does not require the dispatch of personnel.

A number of more recent initiatives are planned to address the one-way and manual limitations of AMR-based grid systems, which include the use of two-way communications provided by so-called "smart meters." There are a number of different two-way communication technologies that are employed by these smart meters, to include spread spectrum RF, wireless mesh, Wi-Fi, and power line communication (PLC). These smart meters and their associated infrastructures, regardless of their corresponding communication technology, are commonly referred to in the art as automated metering infrastructure (AMI), an example of which will now be discussed with reference to FIG. 2.

Turning to FIG. 2, a block diagram is presented depicting an exemplary present day automatic metering infrastructure (AMI) 200. The AMI 200 provides for a plurality of AMI meters 202, 204, each of which is coupled to a corresponding structure 201, like the structures 101 of FIG. 1. In this example, the meters 202, 204 provide for two-way communication over wireless communication links 203 configured as a wireless mesh. Metering data is passed from one AMI meter 202 to the next 202 over the mesh network, and the various data streams arrive at an endpoint AMI meter 204 which functions to relay the aggregated meter readings to a local aggregation point 207. The aggregation point 207 is typically configured with an antenna 206, receiver (not shown), and stores (not shown) adequate to provide for local reception and temporary storage of metering data. The aggregation point 207 is additionally configured to transmit the aggregated metering data over a higher speed communications link 208 back to the resource provider. Various types of communication link technologies are employed to couple the aggregation point 207 to the resource provider, including the technologies noted above with reference to smart meter communications. Cellular (i.e., wireless cell phone) communications are commonly employed to provide for the communication link (also referred to as a "backhaul link") 208.

Operationally, the AMI meters 202, 204, are configured to provide for two-way communications within a limited area to provide the resource provider with metering data and to also allow for control of the resource for particular facilities 201. In the wireless mesh example shown, one skilled in the art will appreciate that because wireless transceivers within the AMI meters 202, 204 are low power by design, there is often a requirement to supplement the mesh network by the addition of a repeater 205, which is employed to amplify signals that have been attenuated as a result of propagation distance, propagation path blockage, or interference.

AMI is effective in overcoming the one-way limitations of former AMR systems. As a result, many utilities are currently replacing AMR meters 102 with newer, more capable AMI meters 202, 204. But the present inventors have observed that AMI meters 202, 204 are significantly more expensive than currently deployed AMR meters 102. Stated differently, in order to upgrade a given area within a grid to provide for AMI, it is necessary to completely replace all of the AMR meters 102 in the area with more expensive AMI meters 202, 204. In addition, aggregation points 207 and associated backhaul communications 208 must be deployed to enable two-way communications between the new AMI meters 202, 204 and the resource provider.

Accordingly, the present inventors have observed that resource providers have a tremendous capital investment in AMR meters 102, which comprises a significant portion of the costs associated with distribution, and to replace these AMR meters 102 with newer and more expensive AMI meters 202, 204 requires yet another costly capital outlay. The present inventors have also noted that the burdensome expense of upgrading an existing AMR grid to provide for AMI capabilities is disadvantageous at best because ultimately the consumer will be paying for the cost of these upgrades, either directly (in terms of increased cost of the resource) or indirectly (through demand limitations and consumption caps).

In addition to the above, the present inventors have noted that to provide backhaul communications 208 from the aggregation point 207 to the resource provider, all present day implementations of AMI typically require an entirely new and costly high bandwidth communications infrastructure 208, the cost of which is also passed on to consumers. Lower speed communications infrastructures exist, such as using cellular and satellite communications as the link 208, but these approaches are bandwidth limited and thus restrict the number of AMI functions that can be performed because the amount and frequency of data that can be transmitted over the link 208 is limited.

The present invention overcomes the above noted limitations, and others, by providing apparatus and methods whereby an existing AMR grid is upgraded to provide for AMI capabilities and additional functions through slight modification to the existing AMR meters 102, thereby eliminating the replacement cost of these meters 102. In addition, the present invention utilizes a significant portion of an existing backhaul infrastructure, thereby simplifying communications between a metered area and a resource provider. The present invention will now be discussed with reference to FIGS. 3-22.

Figure 3:
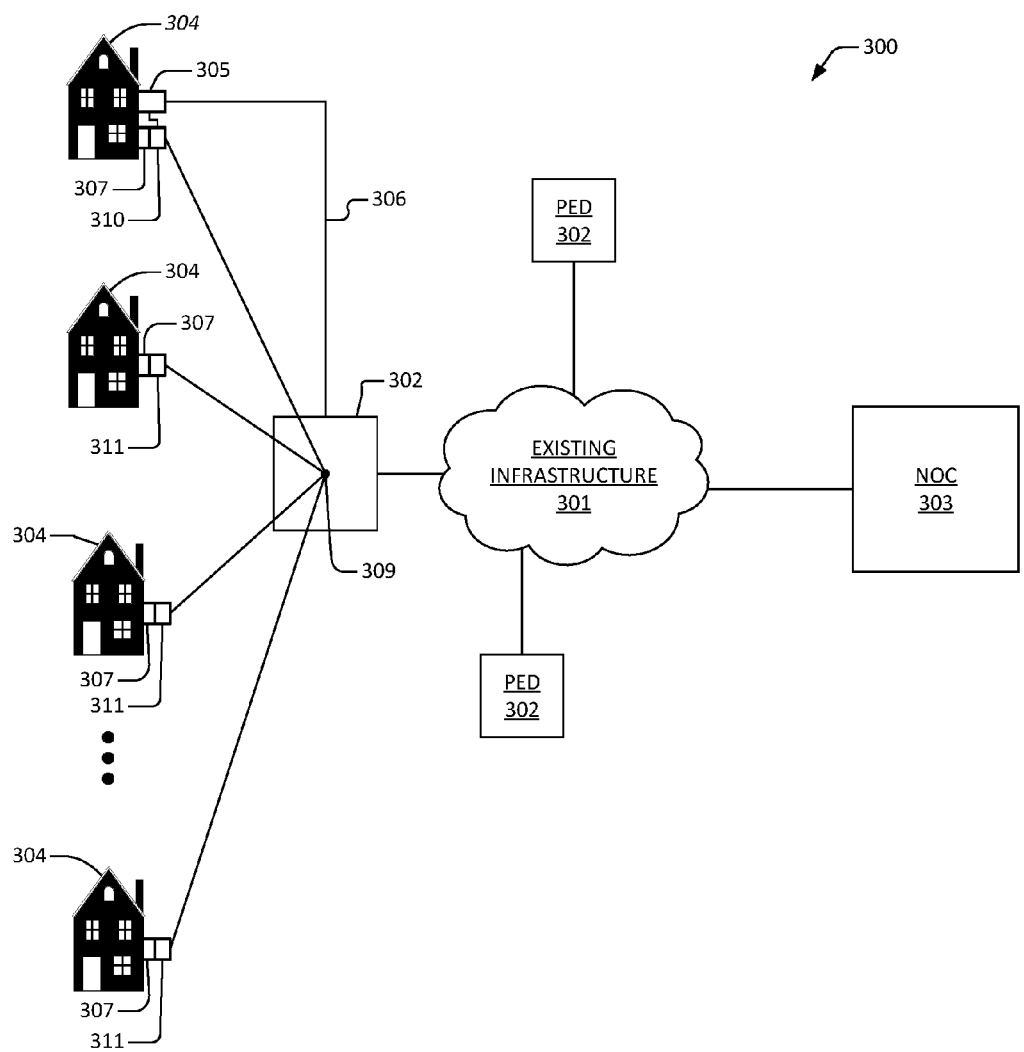
FIG. 3 is a block diagram featuring a grid management system according to the present invention.

Now referring to FIG. 3, a block diagram is presented featuring a grid management system 300 according to the present invention. The system 300 includes a plurality of structures 304 like those 101, 201 of FIGS. 1-2 that consume a resource that is provided and metered by a resource provider. In one embodiment the resource comprises electricity. In another embodiment, the resource comprises natural gas. A third embodiment contemplates water as the resource. Other embodiments are comprehended as well that comprise other consumable resources as has been described above. Each of the structures 304 is with equipped with an existing AMR meter 307, like the meters 102 of FIG. 1. One of the meters 307 in a given area is coupled to a master interface device 310. The remainder of the meters 307 in the given area are each coupled to a slave interface device 311. In one embodiment, the meters 307 comport with requirements prescribed by the ANSI C.12 series of specifications. In another embodiment, the meters 307 fall into the category of standard AMR meters, an example of which is the i210 AMR meter produced by GENERAL ELECTRIC®. In one embodiment, the master interface device 310 and slave interface devices 311 comprise an easily attachable adapter such as a meter collar or the like, as is well known by those skilled in the art. In a second embodiment, the master interface device 310 and slave interface devices 311 comprise circuit cards that are inserted into available slots within the AMR meters 307. An alternative embodiment contemplates a master interface device 310 and slave interface devices 311 that are separate from but collocated with their corresponding meters 307 within a range that is commensurate with reception of AMR data transmitted by the AMR meters 307.

The master device 310 is coupled to all of the slave devices 311 via a communications link 309. In one embodiment, the communications link 309 comprises a wired variable speed serial data link 309 configured as a star network. In a wireless embodiment, the communications link 309 comprises a wireless mesh network.

One embodiment of the grid system 300 contemplates employment of an existing communications infrastructure 301 that couples the communications link 309 to a network operations center 303. The network operations center (NOC) 303 provides for monitoring and control of the resource to each of the facilities 304 through commands and data transmitted and received over a command link 306 that couples the existing communications infrastructure 301 to a high speed data device 305. The high speed data device 305 is coupled to the master device 310 and the master device 310 provides for monitoring and control of all the slave devices 311 coupled thereto via commands and data transmitted and received over the communications link 309.

One embodiment of the present invention contemplates an existing public telephone network 301, which includes wiring pedestals 302 that provide connectivity of the network 301 to each of the facilities 304. As one skilled in the art will appreciate, a typical existing drop from a pedestal 302 to a facility 304 comprises multiple conductors that are available for connections. According to this embodiment, the conductors may comprise copper or other metal wire, coaxial cable, fiber-optic cable, and any other form of fixed transmission media. Additionally, for specialized installations such as those in extremely dense areas, extremely rural areas, and widely-spaced areas, and for installations that preclude utilizing a wire to provide the short distance local area network, a point-to-point secure wireless bridge is also contemplated as the communication link 309.

Another embodiment of the present invention considers an existing cable infrastructure 301 such as is employed to provide television and Internet connectivity to the structures 304. Accordingly, the pedestals 302 may be deployed above ground on poles or underground.

According to any of the above embodiments, it is noted that the command link 306 couples the local grid to the NOC 303 by utilizing a high speed device 305 that is compatible with the existing infrastructure 301. In the case of a public switched telephone network infrastructure 301, the high speed device 305 comprises a digital subscriber line (DSL) modem 305. In the case of a cable-based infrastructure 301, the high speed device 305 comprises a cable modem 305.

In wired embodiments, the communication link 309 comprises a star network where the coupling point is within an existing pedestal 302 or substantially similar cross connect terminal. In wireless embodiments, the pedestal 302 or substantially similar cross connect terminal is employed solely to provide connectivity of the high speed device 305 to the existing infrastructure 301 via the command link 306. In wireless embodiments, the master interface device 310 may be coupled to the high speed device 305 via a wireless link or a wired link.

In operation, each of the slave interface devices 311 and the master interface device 310 are configured to gather data from their corresponding existing AMR meter 307 via either a wired or wireless interface. The master interface device 310 adaptively configures the data rate of the communications link 309 to enable reliable and efficient transfer of data to/from each of the slave devices 311 according to the propagation lengths that are exhibited by the existing infrastructure 301. As one skilled in the art will appreciate, a residential deployment of telephone or cable connects anywhere from one to greater than ten structures 304 within a single pedestal 302. Thus, the propagation path from the master interface device 310 to individual slave devices 311 may vary by greater than a factor of ten. Advantageously then, the variable speed communication link 309 that is adaptively configured by the master interface device 310 to the slave interface devices 311 within a given grid enables additional slave devices 311 to be added or deleted without a requirement for reprogramming.

Thus, all data that is gathered from the AMR meters 307 within the local grid is transmitted to the master interface device 310 over the communications link 309 and the master interface device 310 transmits this data to the NOC 303 via the high speed device 305 that is coupled to the existing infrastructure 301. One embodiment of the present invention contemplates master and slave interface devices 310-311 that are not only capable of gather billing quality data from the AMR meters 307, but which are also coupled to the resource itself and are capable of sampling consumption of the resource at a sample rate commensurate with the analysis of time-varying loads and signatures. This analysis quality data is also transmitted to the NOC 303 via the high speed device 305.

In addition to billing and analysis data, the present invention also contemplates control of the resource at specified facilities 304 via commands sent from the NOC 303 and received by the master interface device 310. If applicable, these commands are subsequently routed to specified slave devices that are coupled to the specified facilities 304. Accordingly, a resource provider is enabled to inexpensively control consumption of the resource at a given facility 304 via commands generated at the NOC 303. This control can range from simple cut-on and cut-off of the resource to scheduled regulation of the resource, such as might be encountered in an electrical power demand response system. Advantageously, no personnel or equipment need be dispatched to both monitor and control resource consumption and existing AMR meters 307 can be fully utilized.

The present invention enables a private, secure, low cost, high reliability, AMI network solution 300 over existing infrastructure 301 that provides utilities and other resource providers with an accelerated and economical path to deployment of AMI and 2-way communication without the expense of replacement of existing AMR meters 307 with new smart meters 202, and without the risk of less proven communication methods.

The present invention overcomes the deficiencies of present day AMI approaches as noted above, and others limitations related to implementing an AMI network. The present inventors have noted that all present known AMI network solutions require a new infrastructure to be built. Thus, it is a feature of the present invention to use an existing infrastructure 301, which is both ubiquitous and scalable. That is, the existing infrastructure 301 is architected and built to accommodate every dwelling 304 under extreme loads with low latency.

The master interface device 310 according to the present invention is configured to perform the functions and operations disclosed herein. The master interface device 310 comprises logic, circuits, devices, or microcode (i.e., micro instructions or native instructions), or a combination of logic, circuits, devices, or microcode, or equivalent elements that are employed to perform the functions and operations according to the present invention. The elements employed to store perform these functions and operations within the master interface device 310 may be shared with other circuits, microcode, etc., that are employed to perform other functions and operations within master interface device 310. According to the scope of the present application, microcode is a term employed to refer to one or more micro instructions. A micro instruction (also referred to as a native instruction) is an instruction at the level that a unit executes. For example, micro instructions are directly executed by a reduced instruction set computer (RISC) processor. For a complex instruction set computer (CISC) processor such as an x86-compatible microprocessor, x86 instructions are translated into associated micro instructions, and the associated micro instructions are directly executed by a unit or units within the CISC processor.

Likewise, the slave interface device 311 according to the present invention is configured to perform the functions and operations disclosed herein. The slave interface device 311 comprises logic, circuits, devices, or microcode (i.e., micro instructions or native instructions), or a combination of logic, circuits, devices, or microcode, or equivalent elements that are employed to perform the functions and operations according to the present invention. The elements employed to perform these functions and operations within the slave interface device 311 may be shared with other circuits, microcode, etc., that are employed to perform other functions and operations within slave interface device 311.

Figure 4:
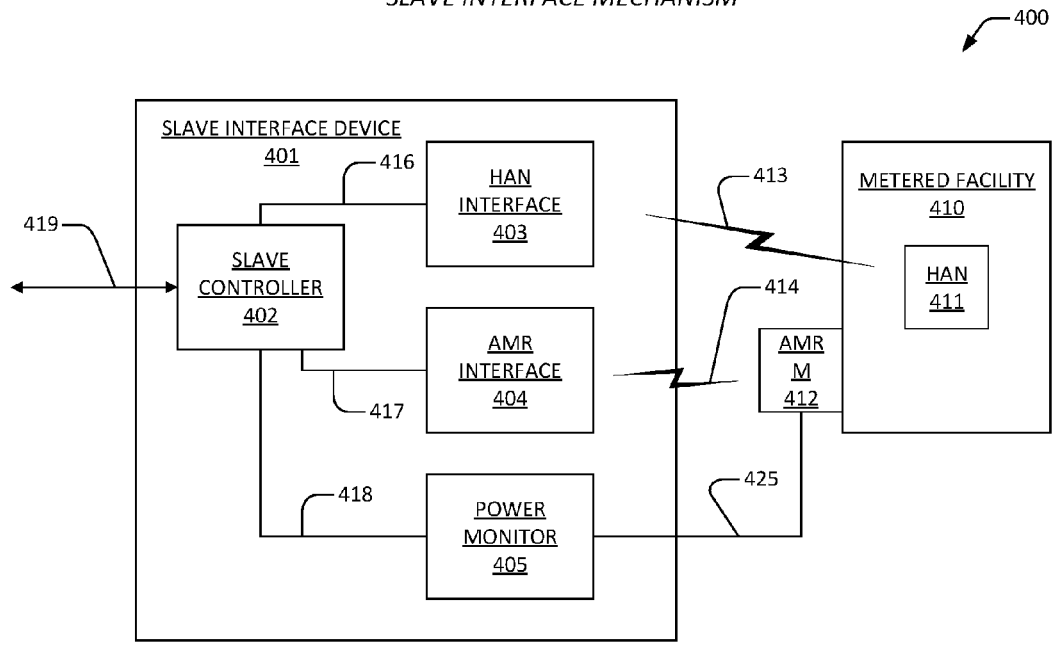
FIG. 4 is a block diagram showing a slave interface mechanism according to the present invention such as might be employed in the grid management system of FIG. 3.

Now turning to FIG. 4, a block diagram 400 is presented showing a slave interface mechanism according to the present invention such as might be employed in the grid management system 300 of FIG. 3. The diagram 400 shows a metered facility 410 like the facilities 304 discussed above. The facility 410 includes an optional home area network (HAN) 411 such as a wireless local area network (WLAN) that is used to control and monitor various appliances (not shown) and devices (not shown) therein. An existing AMR meter (AMRM) 410 is coupled to a resource as discussed above that is being monitored and controlled according to the present invention by a resource provider. A slave interface device 401 substantially similar to the slave interface device 311 of FIG. 3 is coupled to the AMRM 412 by any of the disclosed mechanisms discussed above, that is, collar configuration, card slot configuration, or separate configuration.

In all embodiments, the slave interface device 401 includes an AMR interface 404 that couples the slave interface device 401 to the AMRM 412 via AMR link 414. An optional power monitor 405 within the slave interface device 401 is coupled to the resource itself within the AMRM 412 via optional power bus 425. In addition, a home area network interface 403 within the slave interface device 401 is coupled to the HAN 411 via a HAN wireless link 413.

The slave interface device 401 includes a slave controller 402 that is coupled to the HAN interface 403 via bus 416, the AMR interface 404 via bus 417, and the optional power monitor 405 via bus 418. The slave controller 402 is also coupled to a wired communications link 419 that comprises one leg of a wired variable data rate star network as discussed above with reference to FIG. 3.

In operation, the AMR interface 404 receives data from the AMRM 412, and from any other AMRM (not shown) within a area of reception for the slave interface device 401. The AMR interface 404 provides this data to the slave controller 402 on bus 417.

The slave controller 402 is configured to communicate with a corresponding master interface device (not shown) over the wired communications link 419 at a data rate prescribed by the master interface device. Accordingly, AMR data from the AMRM 412 and from other AMRMs within the reception area is provided to the master interface device over the wired communications link 419.

Optionally, commands from the master interface device are provided by the slave controller 402 to the power monitor 405 via bus 418 to monitor and/or control the resource that is measured by the AMRM 412. In one embodiment, the power monitor 405 is employed to cut on and cut off the resource as described above with reference to FIG. 3. In another embodiment, the power monitor 405 is additionally employed to gather resource consumption data via bus 425 that is at a rate suitable for load signature and other forms of analysis. This data is provided to the slave controller 402 on bus 418 and is subsequently passed to the master interface device over the wired communication link 419. In one embodiment, the master interface device passes all analysis data gathered to the NOC 303, and processing resources within the NOC 303 are employed to perform the load signature and other analyses.

HAN-related commands provided by the NOC 303 are transmitted by the master interface device over the wired communication link 419 and are communicated to/from the HAN 411 by the HAN interface 403 over the HAN wireless link 413. These commands are used to control and monitor performance of individual devices and appliances within the facility 410.

Figure 5:
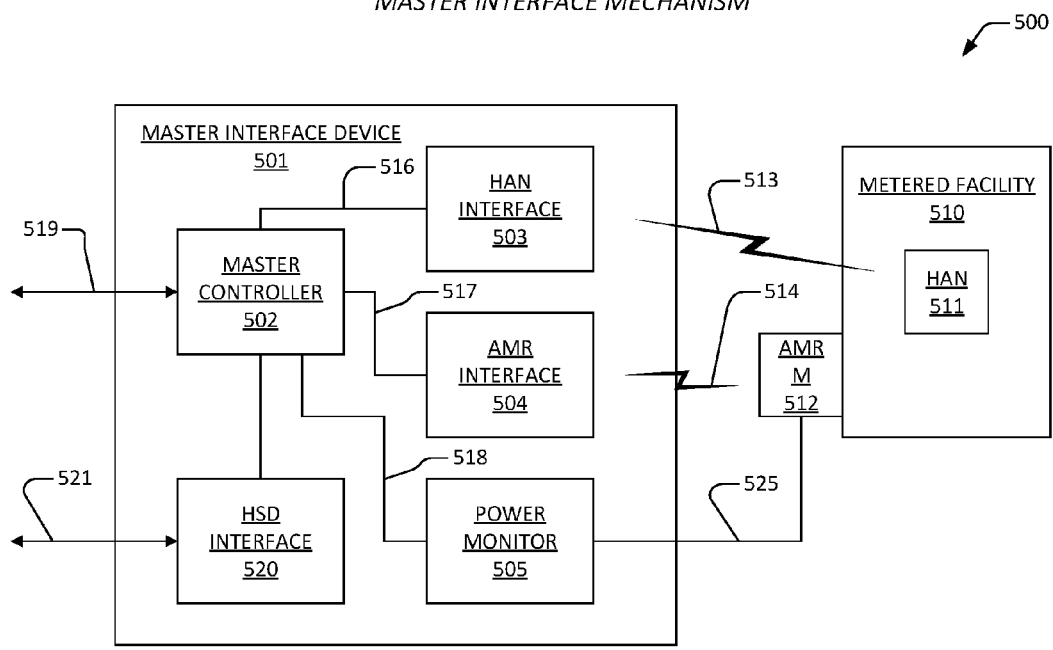
FIG. 5 is a block diagram illustrating a master interface mechanism according to the present invention such as might be employed in the grid management system of FIG. 3.

Now turning to FIG. 5, a block diagram 500 is presented showing a master interface mechanism according to the present invention such as might be employed in the grid management system 300 of FIG. 3. The diagram 500 shows a metered facility 510 like the facilities 304 discussed above. The facility 510 includes an optional home area network (HAN) 511 such as a wireless local area network (WLAN) that is used to control and monitor various appliances (not shown) and devices (not shown) therein. An existing AMR meter (AMRM) 510 is coupled to a resource as discussed above that is being monitored and controlled according to the present invention by a resource provider. A master interface device 501 substantially similar to the master interface device 310 of FIG. 3 is coupled to the AMRM 512 by any of the disclosed mechanisms discussed above, that is, collar configuration, card slot configuration, or separate configuration. The master interface device 501 is additionally coupled to a high speed device (not shown) as discussed above via high speed bus 521.

In all embodiments, the master interface device 501 includes an AMR interface 504 that couples the master interface device 501 to the AMRM 512 via ARM link 514. An optional power monitor 505 within the master interface device 501 is coupled to the resource itself within the AMRM 512 via optional power bus 525. In addition, a home area network interface 503 within the master interface device 501 is coupled to the HAN 511 via a HAN wireless link 513.

The master interface device 501 includes a master controller 502 that is coupled to the HAN interface 503 via bus 516, the AMR interface 504 via bus 517, and the optional power monitor 505 via bus 518. The master controller 502 is also coupled to a wired communications link 519 that comprises one leg of a wired variable data rate star network as discussed above with reference to FIG. 3. The master controller 502 is additionally coupled to a high speed device (HSD) interface 520 that is employed to communicate with the NOC 303 over the existing infrastructure 301 via high speed bus 521.

In operation, the AMR interface 504 receives data from the AMRM 512, and from any other AMRM (not shown) within an area of reception for the master interface device 501. The AMR interface 504 provides this data to the master controller 502 on bus 517.

The master controller 502 is configured to communicate with corresponding slave interface devices (not shown) over the wired communications link 519 at a data rate prescribed by the master interface device 501. Accordingly, AMR data from the AMRM 412, from other AMRMs within the reception area, and from the corresponding slave interface devices on the wired communication link 519 is provided to the master interface device 501. The master interface device 501 also provides commands to and receives data from the corresponding slave devices on the wired communication link 512 to perform the functions of power monitoring and control and home area network interface discussed above with reference to FIG. 4.

Optionally, commands from the NOC 303 are provided by the master controller 502 to the power monitor 505 via bus 518 to monitor and/or control the resource that is measured by the AMRM 512. In one embodiment, the power monitor 505 is employed to cut on and cut off the resource as described above with reference to FIG. 3. In another embodiment, the power monitor 505 is additionally employed to gather resource consumption data via bus 525 that is at a rate suitable for load signature and other forms of analysis. This data is provided to the master controller 502 on bus 518 and is subsequently passed to the NOC 303 over the existing infrastructure 301 via the high speed data link 521. In one embodiment, the master interface device 501 passes all analysis data gathered to the NOC 303, and processing resources within the NOC 303 are employed to perform the load signature and other analyses.

HAN-related commands provided by the NOC 303 are examined by the master controller 502 to determine if they are intended for the master interface device 501 or one of the corresponding slave interface devices. If intended for the master interface device 501, then these commands are provided to the HAN interface 503 via bus 516 and are communicated to the HAN 511 via HAN link 513. If intended for a slave device, then these commands are transmitted by the master interface device 501 over the wired communication link 519 and are communicated to/from a HAN within a designated slave interface device.

Figure 6:
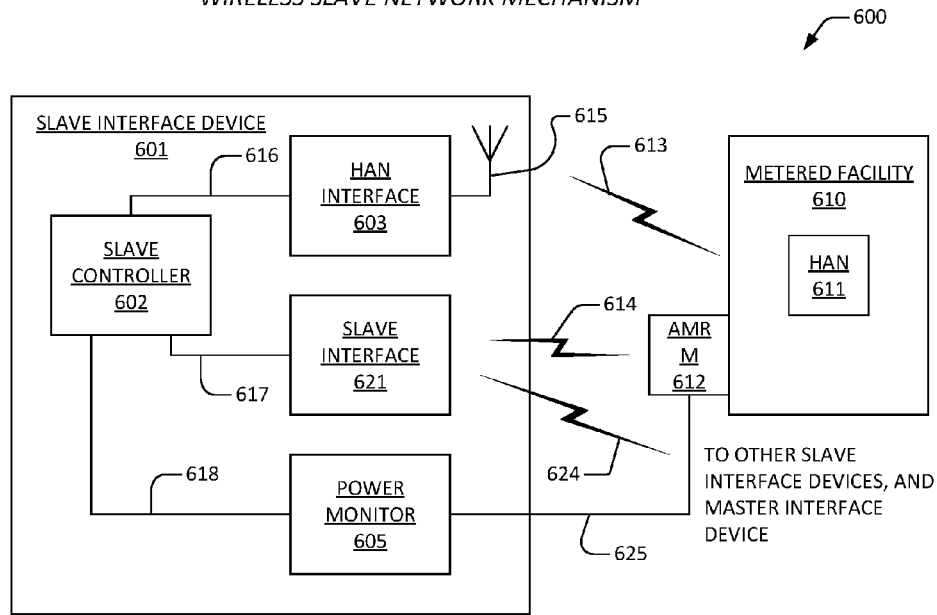
FIG. 6 is a block diagram detailing a wireless slave interface mechanism according to the present invention such as might be employed in the grid management system of FIG. 3.

Now turning to FIG. 6, a block diagram 600 is presented showing a wireless slave interface mechanism according to the present invention such as might be employed in the grid management system 300 of FIG. 3. The diagram 600 shows a metered facility 610 like the facilities 304 discussed above. The facility 610 includes an optional home area network (HAN) 611 such as a wireless local area network (WLAN) that is used to control and monitor various appliances (not shown) and devices (not shown) therein. An existing AMR meter (AMRM) 610 is coupled to a resource as discussed above that is being monitored and controlled according to the present invention by a resource provider. A wireless slave interface device 601 is coupled to the AMRM 612 by any of the disclosed mechanisms discussed above, that is, collar configuration, card slot configuration, or separate configuration. The difference between the wireless slave interface device 601 and the wired slave interface device 401 of FIG. 4 is that communications between a master device and slave devices within a local grid are performed over a wireless communications link 624.

In all embodiments, the slave interface device 601 includes slave interface 621 that couples the slave interface device 601 to the AMRM 612 via ARM link 614 and to other wireless slave interface devices and a master interface device within the local grid via wireless link 624. In the embodiment shown, communications provided by the slave interface 621 over wireless link 624 take the place of the wired communication link 419 of the embodiment of FIG. 4. One embodiment of the present invention comprehends a wireless mesh network as the wireless link 624 according to protocols prescribed by IEEE 802.15.4 specifications. Another embodiment contemplates an IEEE 802.11 wireless network.

An optional power monitor 605 within the slave interface device 601 is coupled to the resource itself within the AMRM 612 via optional power bus 625. In addition, a home area network interface 603 within the slave interface device 601 is coupled to the HAN 611 via a HAN wireless link 613.

The slave interface device 601 includes a slave controller 602 that is coupled to the HAN interface 603 via bus 616, the slave interface 621 via bus 617, and the optional power monitor 605 via bus 618.

In operation, the slave interface 621 receives data from the AMRM 612, and from any other AMRM (not shown) within an area of reception for the slave interface device 601. The slave interface 621 provides this data to the slave controller 602 on bus 617.

The slave controller 602 is configured to communicate with a corresponding master interface device (not shown) over the wireless communications link 624. Accordingly, AMR data from the AMRM 612 and from other AMRMs within the reception area is provided to the master interface device over the wireless communications link 624 via the slave interface 621.

Optionally, commands from the master interface device received by the slave interface 621, provided to the slave controller 602 via bus 617, and are provided by the slave controller 602 to the power monitor 605 via bus 618 to monitor and/or control the resource that is measured by the AMRM 612. In one embodiment, the power monitor 605 is employed to cut on and cut off the resource as described above with reference to FIG. 3. In another embodiment, the power monitor 605 is additionally employed to gather resource consumption data via bus 625 that is at a rate suitable for load signature and other forms of analysis. This data is provided to the slave controller 602 on bus 618 and is subsequently passed to the master interface device over the wireless communication link 624. In one embodiment, the master interface device passes all analysis data gathered to the NOC 303, and processing resources within the NOC 303 are employed to perform the load signature and other analyses.

HAN-related commands provided by the NOC 303 are transmitted by the master interface device over the wireless communication link 624 and are communicated to/from the HAN 611 by the HAN interface 603 over the HAN wireless link 613. These commands are used to control and monitor performance of individual devices and appliances within the facility 610.

Figure 7:
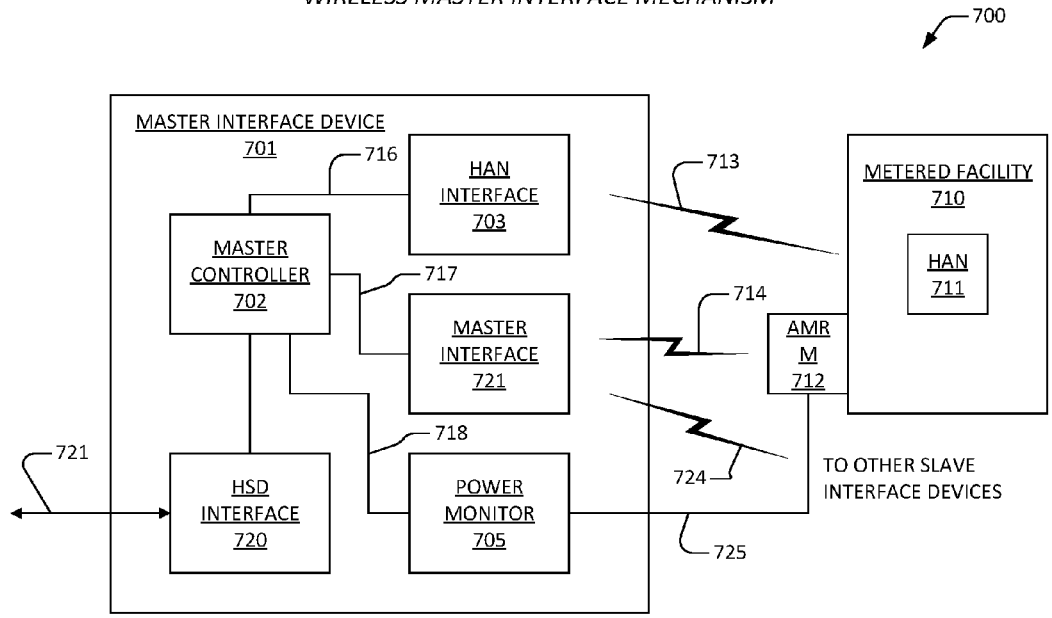
FIG. 7 is a block diagram showing a wireless master interface mechanism according to the present invention such as might be employed in the grid management system of FIG. 3.

Turning now to FIG. 7, a block diagram 700 is presented showing a wireless master interface mechanism according to the present invention such as might be employed in the grid management system 300 of FIG. 3. The diagram 700 shows a metered facility 710 like the facilities 304 discussed above. The facility 710 includes an optional home area network (HAN) 711 such as a wireless local area network (WLAN) that is used to control and monitor various appliances (not shown) and devices (not shown) therein. An existing AMR meter (AMRM) 710 is coupled to a resource as discussed above that is being monitored and controlled according to the present invention by a resource provider. A wireless master interface device 701 is coupled to the AMRM 712 by any of the disclosed mechanisms discussed above, that is, collar configuration, card slot configuration, or separate configuration. The wireless master interface device 701 is additionally coupled to a high speed device (not shown) as discussed above via high speed bus 721.

In all embodiments, the master interface device 701 includes a master interface 721 that couples the master interface device 701 to the AMRM 712 via ARM link 714 and to other wireless slave devices within the local grid via wireless link 724. Embodiments of the wireless link 724 comport with those described for wireless link 624 discussed above with reference to FIG. 6.

An optional power monitor 705 within the master interface device 701 is coupled to the resource itself within the AMRM 712 via optional power bus 725. In addition, a home area network interface 703 within the master interface device 701 is coupled to the HAN 711 via a HAN wireless link 713.

The master interface device 701 includes a master controller 702 that is coupled to the HAN interface 703 via bus 716, the master interface 721 via bus 717, and the optional power monitor 705 via bus 718. The master controller 702 is additionally coupled to a high speed device (HSD) interface 720 that is employed to communicate with the NOC 303 over the existing infrastructure 301 via high speed bus 721.

In operation, the master interface 721 receives data from the AMRM 712, and from any other AMRM (not shown) within an area of reception for the master interface device 501. The master interface 721 provides this data to the master controller 702 on bus 717.

The master controller 702 is configured to also direct the master interface 721 to communicate with corresponding slave interface devices (not shown) over the wireless communications link 724. Accordingly, AMR data from the AMRM 712, from other AMRMs within the reception area, and from the corresponding slave interface devices on the wireless communication link 724 is provided to the master interface device 701. The master interface device 701 also provides commands to and receives data from the corresponding slave devices on the wireless communication link 724 to perform the functions of power monitoring and control and home area network interface discussed above with reference to FIG. 5.

Optionally, commands from the NOC 303, received over the high speed bus 721, are provided by the master controller 702 to the power monitor 705 via bus 718 to monitor and/or control the resource that is measured by the AMRM 712. In one embodiment, the power monitor 505 is employed to cut on and cut off the resource as described above with reference to FIG. 3. In another embodiment, the power monitor 705 is additionally employed to gather resource consumption data via bus 725 that is at a rate suitable for load signature and other forms of analysis. This data is provided to the master controller 702 on bus 718 and is subsequently passed to the NOC 303 over the existing infrastructure 301 via the high speed data link 521. In one embodiment, the master interface device 701 passes all analysis data gathered to the NOC 303, and processing resources within the NOC 303 are employed to perform the load signature and other analyses.

HAN-related commands provided by the NOC 303 are examined by the master controller 702 to determine if they are intended for the master interface device 701 or one of the corresponding slave interface devices. If intended for the master interface device 701, then these commands are provided to the HAN interface 703 via bus 716 and are communicated to the HAN 711 via HAN link 713. If intended for a slave device, then these commands are transmitted by the master interface device 701 over the wireless communication link 724 and are communicated to/from a HAN within a designated slave interface device.

Figure 8:
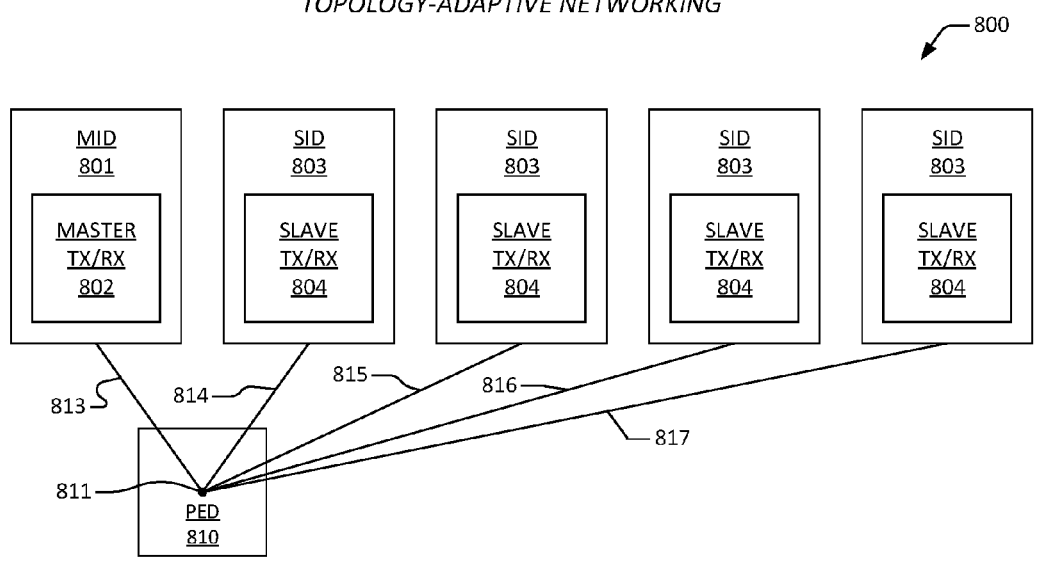
FIG. 8 is a block diagram depicting topology-adaptive networking according to the present invention.

Referring now to FIG. 8, a block diagram 800 is presented depicting topology-adaptive networking according to the present invention. Such adaptive networking is provided for by the wired master interface device 501 and wired slave interface device 601 of FIGS. 5 and 6, respectively. The diagram 800 shows a wired master interface device 801 that is coupled to a plurality of wired slave interface devices 803 via a wired star network whose coupling point 811 resides within an existing pedestal 810 or similar cross-connect device. As shown in the diagram 800, the physical lengths for transmission of data over various legs 813-817 is varied and thus, as one skilled in the art will appreciate, transmission and reception of data is subject to transmission line effects that are typically unknown prior to deployment.

Accordingly, the master interface device 801 additionally includes a master TX/RX 802 that couples the master interface device 801 to the star network. In one embodiment, the master TX/RX 802 is disposed within the master controller 502. Likewise the slave interface devices 803 includes corresponding slave TX/RX 804 that couple the slave interface devices 803 to their respective legs of the star network.

In operation, the master TX/RX 802 performs communication tests with each of the slave interface devices 803 on the star network to determine an optimum data rate at which to operate. A communications protocol according to the present invention includes the capability for the master device 801 to communicate with the slave devices 803 at a prescribed data rate, thus allowing the rate of data transfer to be increased or decreased in order to provide for reliable transmission and reception of data over the various legs 813-817 of the network. In one embodiment, slave TX/RX 804 within each of the slave devices 803 is configured to adjust their respective data rates responsive to direction from the master device 801.

The present inventors have observed that certain resource providers may not be able to move forward in a retrofit of their existing AMR meters to provide the 2-way communications capabilities and other capabilities noted above, yet they may desire to reduce or eliminate fleet costs associated with gather usage data as is shown in FIG. 1. As one skilled in the art will appreciate, not only are fleet resources expensive to operate and maintain, but because typical configurations of AMR meters implement variants of the ERT protocol, meter reading trucks are configured with more expensive wideband receives that are capable of receiving transmissions from individual meters on any one of the available frequencies when the trucks are dispatched. Accordingly, one aspect of the present invention contemplates providing a fixed network of low cost narrowband receiving devices that implement a novel and cost effective technique for receiving and correlating AMR packets, not only to obtain usage data related to billing, but also to obtain real time meter data. This real time data may be utilized by a utility or managing entity for any number of purposes and does not require the dispatch of fleet resources or personnel. In one embodiment, the present invention comprises a network of low cost narrowband receivers which may be deployed across a geographic area that is collocated with a plurality of AMR meters in order to facilitate reading of the meters in a low cost and reliable fashion, while also providing the capability to capture and transport continuous broadcasts from AMR meters in order to facilitate monitoring real time energy consumption.

Figure 9:
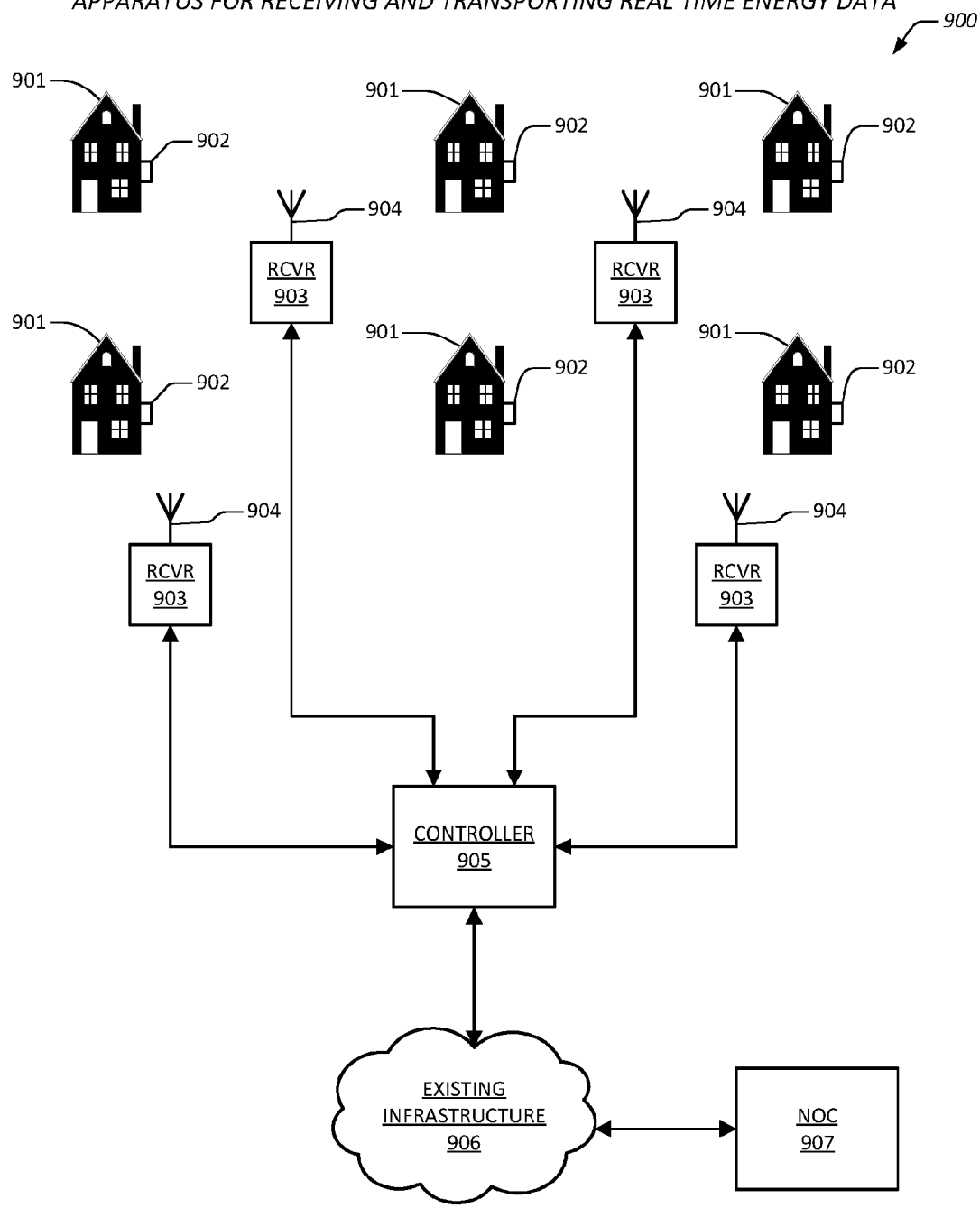
FIG. 9 is a block diagram illustrating an apparatus for receiving and transporting real time energy data according to the present invention.

Referring to FIG. 9, a block diagram 900 is presented illustrating an apparatus for receiving and transporting real time energy data according to the present invention. The diagram 900 depicts a plurality of geographically collocated facilities 901 that are each equipped with an AMR meter 902 as is described above. The apparatus includes a plurality of low cost, tunable, narrowband receivers 903 with antennae 904 that are deployed within the geographic area such that broadcasts from AMR packet transmissions from each of the individual AMR meters 902 can be captured by at least one of the antennae 904/receivers 903 on at least one of a plurality of narrowband broadcast frequencies. In one embodiment, the antennae 904/receivers 903 are configured to comport with the eight pre-defined narrowband frequency channels corresponding to the ERT protocol, wherein eight identical AMR packets are transmitted on each of eight different narrowband frequencies according to a frequency hopping sequence, and wherein the AMR packets contain meter identification along with usage data.

The receivers 903 are coupled to a controller 905 and the controller is coupled to a network operations center (NOC) 907 via an existing infrastructure 906 (e.g., DSL, cable, etc.) as is described above with reference to FIG. 3.

In operation, the controller 905 configures each of the receivers 903 such that all of the meters 902 in the geographic area are identified and the frequency hopping sequence for each of the meters is determined. Thereafter, the controller 905 configured to configure each of the receivers 903 in terms of channel assignment such that optimal coverage of the AMR meters 902 is achieved to provide for reception of real time usage data. The controller 905 is also configured to transport this real time usage data over the existing infrastructure to the NOC 907 via known mechanisms.

Advantageously, even though the hop sequence of each AMR meter 902 is not initially known, the low cost receivers 903 according to the present invention are initially programmed by the controller 905 to each receive on a different channel. Over time, the channel of each receiver 903 is rotated, such that the total channels for each geographic region are monitored over a sufficiently long interval until all local transmitters 902 have been identified. In one embodiment, the receivers 903 are networked and communicate a time-stamped value of each AMR packet that they receive to the controller 905. The controller 905 is thus enabled to discover local transmitters 902, signal quality, hop sequence, and probable geographic location of each of the transmitters 902. Once the transmitters 902 are mapped with respect to hop sequence, location, and signal quality, the controller 905 then directs the network of receivers 903 to monitor the most efficacious channels providing optimal coverage in order to improve network reliability. Advantageously, the present invention provides significant improvements over a single, centrally located multiband receiver in terms of reduced cost, increased long term signal quality, increased redundancy, providing the capability to identify probable locations of transmitters 902, and eliminating a requirement for any a-priori knowledge of hop sequence.

Figure 10:
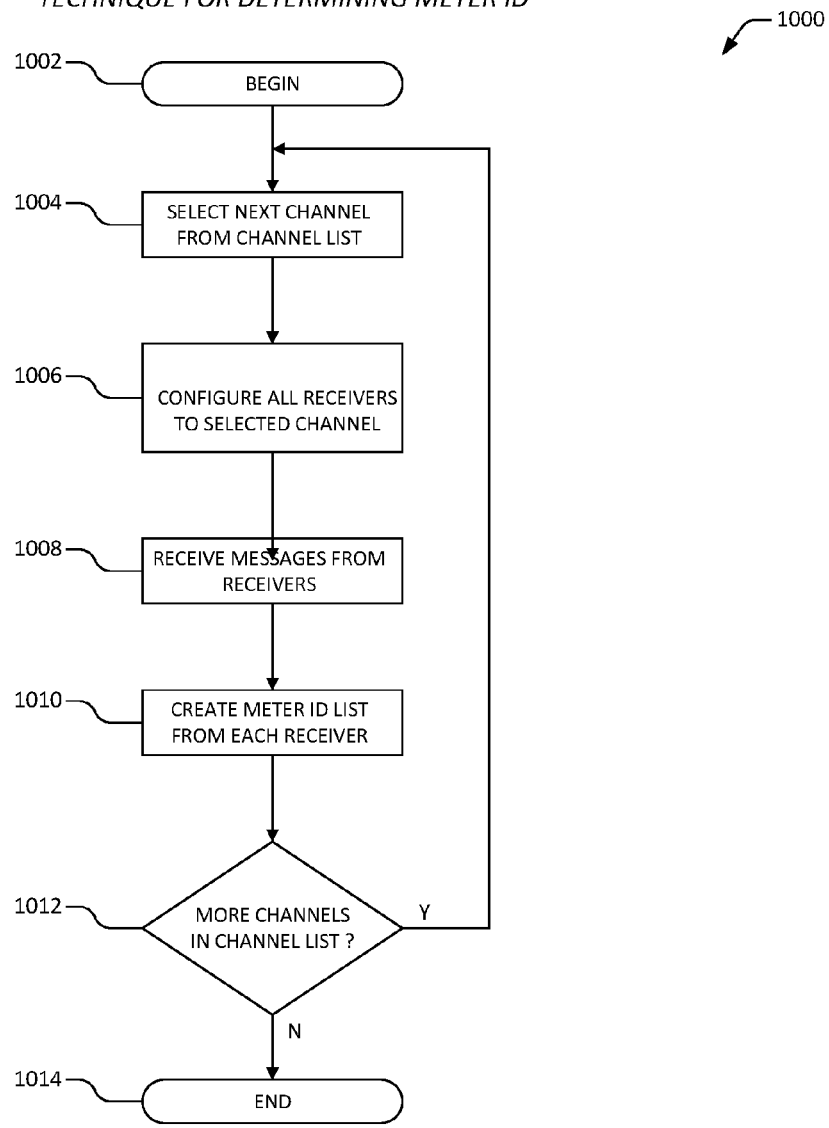
FIG. 10 is a flow diagram depicting a method employed by the apparatus of FIG. 9 to identify meters based upon received messages.

Turning to FIG. 10, a flow diagram 1000 is presented depicting a method employed by the apparatus of FIG. 9 to identify meters 902 based upon received AMR messages. Flow begins at block 1002 where a configuration of antennae 904/receivers 903 are deployed in a geographic area as discussed with reference to FIG. 9. Flow then proceeds to block 1004.

At block 1004, the controller 905 selects a next frequency channel from a pre-programmed list of channels. Flow then proceeds to block 1006.

At block 1006, the controller 905 directs all of the receivers 903 to change reception frequency to the channel selected at block 1004. Flow then proceeds to block 1008.

At block 1008, the receivers 903 receive any AMR packets that are transmitted by the AMR meters 902 on the selected channel and these packets are forwarded to the controller 905. Flow then proceeds to block 1010.

At block 1010, the controller 905 decodes the packets and extracts the meter ID data that was transmitted. The controller 905 creates/updates a meter ID list for the associated receivers 903 that obtained the packets on the selected channel. Flow the proceeds to decision block 1012.

At decision block 1012, an evaluation is made to determine if there are more channels to scan in the channel list. If not, then flow proceeds to block 1014. If so, then flow proceeds to block 1004.

At block 1014, the method completes.

Figure 11:
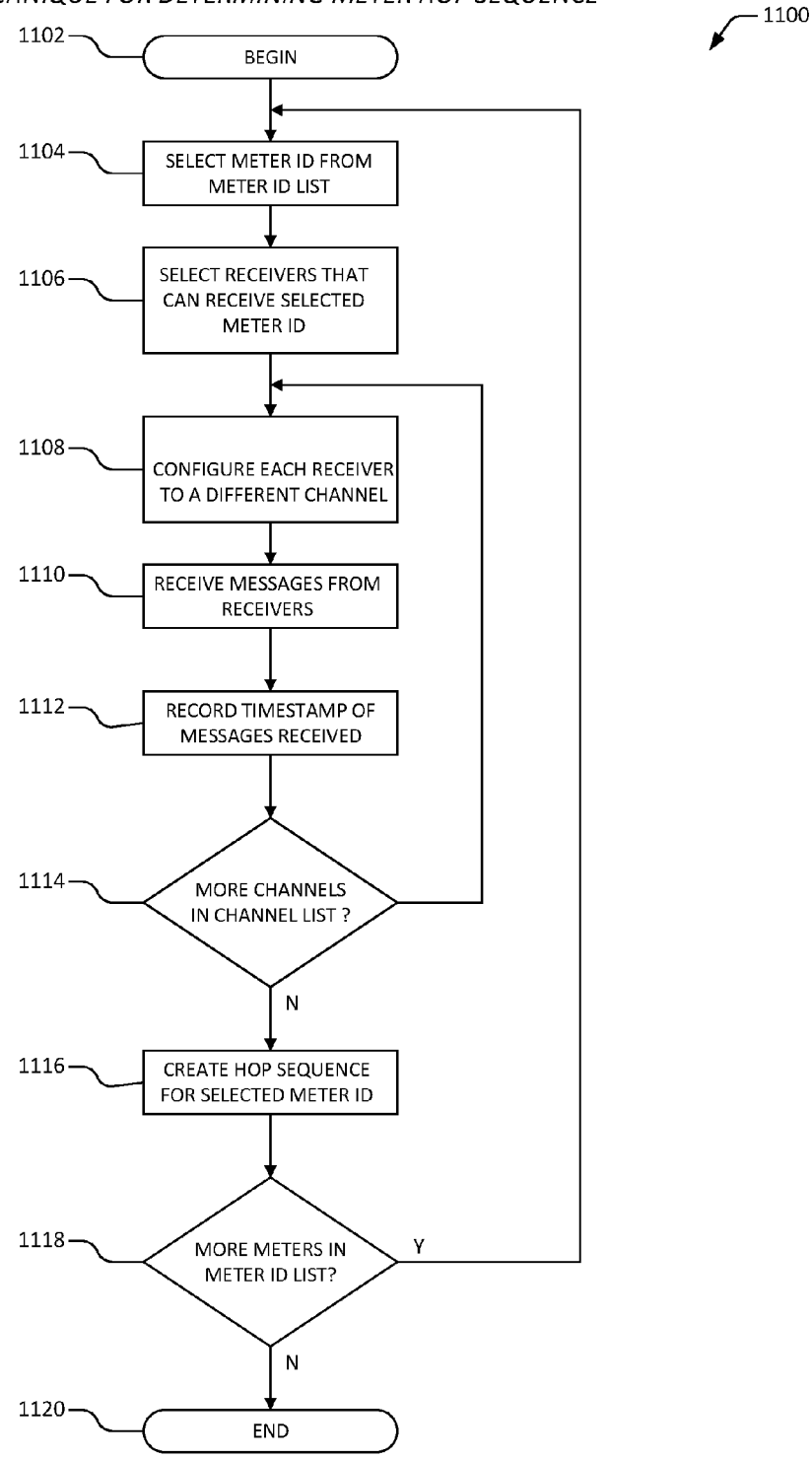
FIG. 11 is a flow diagram featuring a method employed by the apparatus of FIG. 9 to determining a hop sequence for identified meters.

Now referring to FIG. 11 a flow diagram 1100 is presented featuring a method employed by the apparatus of FIG. 9 to determining a hop sequence for meters 902 identified by the method of FIG. 10. The method begins at block 1102 where a controller 905 according to the present invention generates a meter ID list according to the method of FIG. 10. Flow then proceeds to block 1104.

At block 1104, the controller 905 selects a meter ID from the generated meter ID list. Flow then proceeds to block 1106.

At block 1106, receivers 903 that can receive the selected meter ID are selected. Flow then proceeds to block 1108.

At block 1108, each of the selected receivers 903 are configured by the controller 905 to receive AMR packet broadcasts on different frequency channels. Flow then proceeds to block 1110.

At block 1110, the selected receivers 903 receive the AMR packet broadcasts for the selected meter ID on their respective different frequency channels. Flow then proceeds to block 1112.

At block 1112, the controller 905 records a timestamp for each of the AMR packet broadcasts received at block 1110. Flow then proceeds to decision block 1114.

At decision block 1114, an evaluation is made to determine if there are more channels that remain in the channel list. That is, the evaluation is made in the case where there more channels to monitor than there are deployed receivers 903. If not, then flow proceeds to block 1116. If so then flow proceeds to block 1108.

At block 1116, since all channels have been monitored and received packets time stamped, the controller 905 generates a hop sequence for the meter ID selected at block 1104. Flow then proceeds to decision block 1118.

At decision block 1118, an evaluation is made to determine if there are more meters 902 that remain in the meter ID list which have not been mapped for hop sequence. If so, then flow proceeds to block 1104. If not, then flow proceeds to block 1120.

At block 1120, the method completes.

Figure 12:
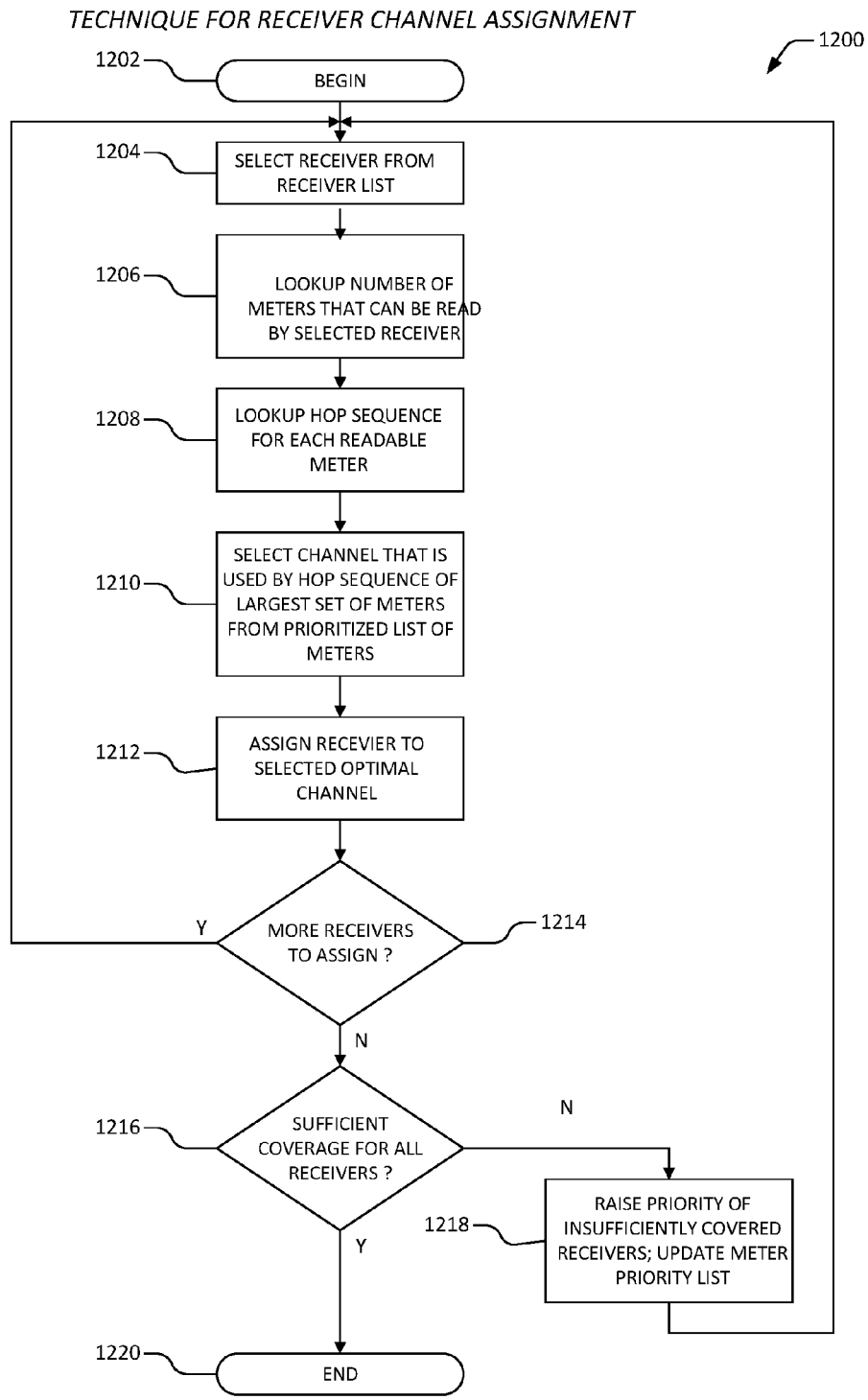
FIG. 12 is a flow diagram showing a method employed by the apparatus of FIG. 9 for assigning receiver channels in order to ensure optimal meter coverage.

FIG. 12 is a flow diagram showing a method employed by the apparatus of FIG. 9 for assigning receiver channels in order to ensure optimal meter coverage. Flow begins a block 1202 where a configuration of receivers 903 and a controller 905 according to the present invention begin reception of AMR packet broadcasts for meters 902 identified via the method of FIG. 10 and whose hop sequences have been determined by the method of FIG. 11. Flow then proceeds to block 1204.

At block 1204, a next receiver 903 is selected from a list of receivers 903 corresponding to the configuration. The list of receivers 903 includes a priority associated with each meter 902 based upon the number of receivers 903 that can receive AMR packet broadcasts therefrom. Flow then proceeds to block 1206.

At block 1206, the controller 905 determines the number of meters 902 that can be read by the selected receiver 903. Flow then proceeds to block 1208.

At block 1208, the hop sequence for each readable meter 902 is determined based upon the results of the method of FIG. 11. Flow then proceeds to block 1210.

At block 1210, a frequency channel that is used by the hop sequence of the largest number of meters 902 that were determined at block 1206 is selected. Flow then proceeds to block 1212.

At block 1212, the controller 905 directs the selected receiver 903 to begin receiving on the selected channel. Flow then proceeds to decision block 1214.

At decision block 1214, an evaluation is made to determine if all receivers 903 in the configuration have been assigned a frequency channel. If not, then flow proceeds to block 1204. If so, then flow proceeds to decision block 1216.

At decision block 1216, an evaluation is made by the controller 905 to determine if there is sufficient coverage from all receivers 903 to address all of the meters 902 in the configuration. If so, then flow proceeds to block 1220. If not, then flow proceeds to block 1218.

At block 1218, the priority of the insufficiently covered receivers 903 is raised and a meter priority list is updated. Flow then proceeds to block 1204.

At block 1220, the method completes.

In view of potential applications of the present invention as discussed above with reference to FIGS. 3-12, the present inventors have noted that certain configurations of wireless devices may require varying levels of security associated with both installation and commissioning. As is well known in the art, most present day wireless device configurations utilize geographic proximity as a simple go/no-go discriminator for purposes of device installation and commissioning, and these configurations furthermore typically utilize the same level of security (e.g., algorithm and key length) across all levels of proximity. The present inventors have observed that the present day approach is cumbersome for both device commissioning and normal interaction. Accordingly, the present invention provides an apparatus and method for location base wireless security that employs knowledge about the proximity of wireless devices to create a tiered security strategy. That is, devices within close proximity are allowed to communicate with minimal security provisions (e.g., algorithm choice, key type and length, and etc.), while increasingly distant wireless devices are configured to communicate with increasingly more security provisions. In one embodiment, when network propagation metrics are known, the present invention provides for scalable security provisions such that different network communication types (e.g., wireless star, mesh multi-hop, wired) can dynamically configure tiered security keys.

Advantageously, by creating a tiered approach to secure communications between devices based upon proximity metrics and/or location information, communication between these devices can be accomplished in a more natural way, just as a computer in a living room has less security access restrictions to users inside a room than for those outside of the room. Not only is the present invention well suited for networks of devices that are portable and mobile, but it is also applicable to networks of devices that require commissioning and configuration in-situ. One embodiment of the present invention comprehends a system for security in a wireless network, where devices within the network utilize geographic location information to dynamically select an appropriate level of security. In this manner, devices that are known to be in closer proximity are configured with reduced security requirements. As the devices in the network become physically separated, the security requirements are appropriately escalated.

Figure 13:
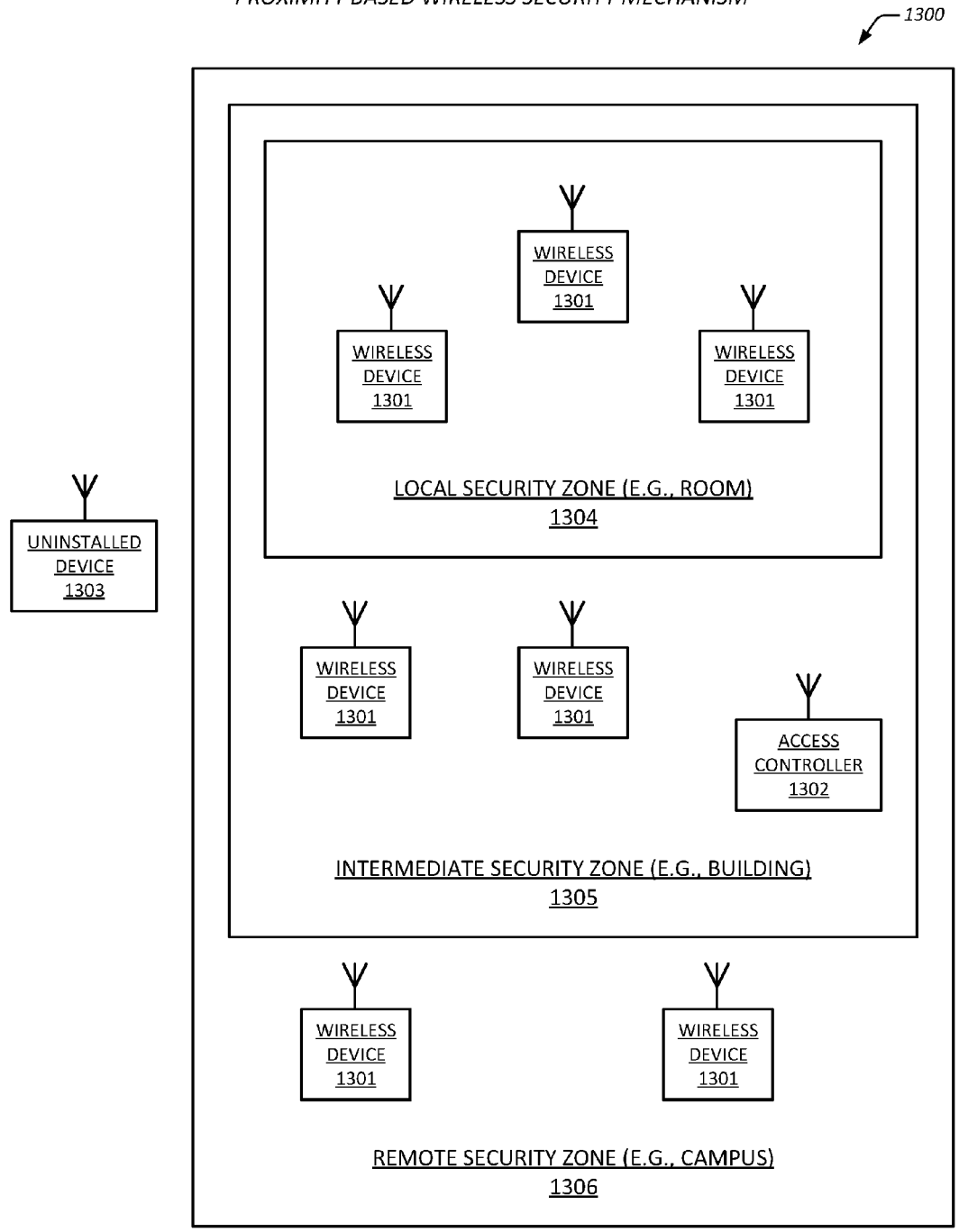
FIG. 13 is a block diagram illustrating a proximity based wireless security mechanism according to the present invention.

Turning now to FIG. 13, a block diagram is presented illustrating a proximity based wireless security mechanism 1300 according to the present invention. The mechanism 1300 includes a plurality of wireless devices 1301, some of which are in close proximity within a local security zone 1304, some of which are in farther proximity within an intermediate security zone 1305, some of which are within distant proximity within a remote security zone 1306. An uninstalled device 1303 is shown to be outside all three security zones 1304-1306. The mechanism 1300 includes an access controller 1302 that is responsible for monitoring the proximity of each of the devices 1301, 1303 within/without the zones 1304-1306, and that configures each of the devices 1301, 1303 with security provisions (including denial of access) commensurate with their corresponding zone 1304-1306. Although the access controller 1302 is shown dispose in the intermediate zone 1305, the present inventors note that such a controller 1302 may be disposed in any zone 1304-1306 or removed therefrom where provisions exist for communications between the controller 1302 and the devices 1301, 1303.

Operationally, the controller 1302 configures devices 1301 in the local zone 1304 to implement security provisions as discussed above that are minimal. The controller 1302 configures devices 1301 in the intermediate zone 1305 to implement increased security provisions. And devices 1301 in the remote security zone 1306 are configured by the controller 1302 to implement more security provisions than those devices 1301 in the intermediate zone.

Because the uninstalled device 1303 falls outside the defined security zones, the controller 1302 precludes it from joining the network.

Although only three security zones 1304-1306 are depicted, the present inventors note that such is shown for clarity sake and there present invention contemplates any number of security zones having successively increased levels of security provisions for devices disposed therein.

Figure 14:
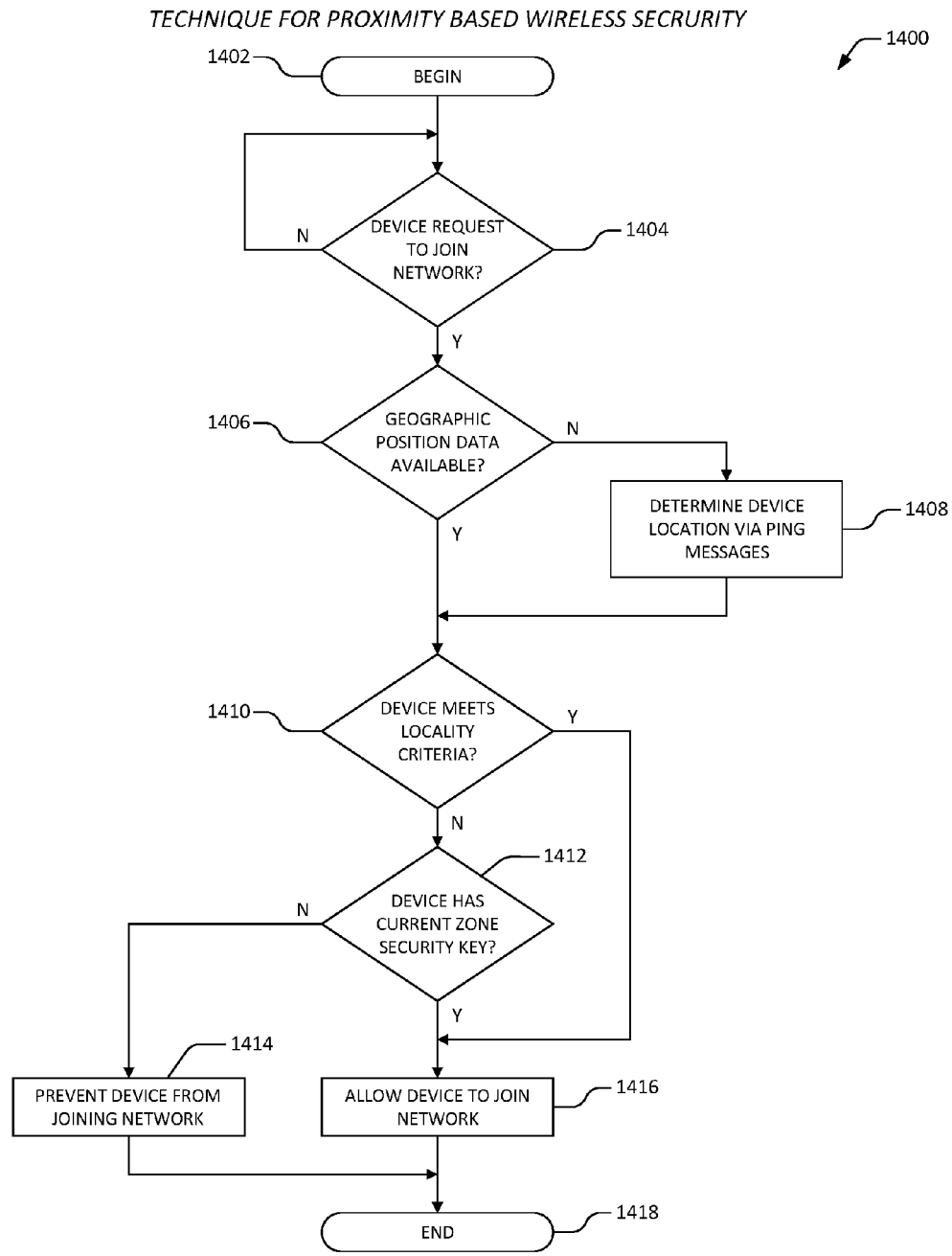
FIG. 14 is a flow diagram detailing a technique employed by the security mechanism of FIG. 13 to allow or prevent devices from joining a network.

Now referring to FIG. 14, a flow diagram 1400 is presented detailing a technique employed by the security mechanism of FIG. 13 to allow or prevent devices from joining a network. Flow begins at block 1402 where a controller 1302 according to the present invention monitors access and proximity of devices 1301 within the network. Flow then proceeds to decision block 1404.

At decision block 1404, the controller 1302 monitors for requests by uninstalled devices 1303. If there are none, then flow proceeds to decision block 1404. If so, then flow proceeds to decision block 1406.

At decision block 1406, the controller 1302 determines if the uninstalled device 1302 is capable of providing geographic position data (e.g., GPS data). If so, the flow proceeds to decision block 1410. If not, then flow proceeds to block 1408.

At block 1408, the controller determines the relative location of the uninstalled device 1303 by issuing ping messages and evaluating response latencies associated therewith. For example, if ping responses exhibit latencies commensurate with those devices 1301 in the intermediate security zone 1305, then the uninstalled device 1303 is determined by the controller to be in the intermediate security zone 1305 as well. Flow then proceeds to decision block 1410.

At decision block 1410, the controller 1302 determines if the uninstalled device 1303 meets locality criteria for any of the pre-defined security zones 1304-1306. If so, the flow proceeds to block 1416. If not, then flow proceeds to decision block 1412.

At block 1412, the controller 1302 determines if the uninstalled device 1303 possesses a security key for the zone requested by the device 1303. If not, then flow proceeds to block 1414. If so, then flow proceeds to block 1416.

At block 1414, the device 1303 is precluded from joining the network and flow proceeds to block 1418.

At block 1416, the device 1303 is allowed to join the network and flow proceeds to block 1418.

At block 1418, the method completes.

The present inventors have additionally noted that understanding the topology and communication behavior of a mesh network, such as the network discussed with reference to FIGS. 3-8, is difficult, but important. Each installation provides unique challenges in topologies, interference, and control points. A mesh network's response in reaction to these challenges is different as well. Installers and designers often become interested with the connectivity of networks as a consequence. Unlike a traditional wired installation, wireless topology and behavior is not something that can be easily seen and verified. And manufacturers have invested heavily in the development of mesh network analysis tools, yet these tools are more often than not too complex for installers to understand and effectively use.

Consequently, the present inventors have observed that one of the figures of merit affecting the performance of a mesh network installation is the number of hops from a central point to any endpoint. Accordingly, one aspect of the present invention focuses on how a message propagates between routers in the network before arriving at a destination device. A great cost savings occurs in the installation of networks where it is discovered that there are fewer hops than there are routers because the unnecessary routers can be removed and reused.

In order to determine the topology of a given network, most analysis tools clog the network with link status messages between devices and then backhaul diagnostic traffic packets to a collector that can display this information. But it is noted that such an approach is limiting in that the "analysis" traffic introduces an artificial load and type into the network, while also impeding normal operation.

The present invention removes these complexities in measurement by introducing a selectable store-and-forward delay in the operation of each router in a network of devices. By creating a substantial delay in each routed hop in the network, the hops needed to route a message between source and destination can easily be measured. In one embodiment, the store-and-forward delay is orders of magnitude larger than that normally introduced by message propagation and internal routing software. In one embodiment, the routing delays are programmable and provide for the creation of measurable latency in messages sent between a source device and a destination device. This latency is analyzed in order to ascertain the routers that are participating in the message routing, and to understand the topology of a complex network. Because the routing delays are much greater than normal propagation delays, the network according to the present invention is not affected by the introduction of this additional traffic.

This present invention introduces programmable delays inside a router (i.e., any device that routes messages as part of a multi-hop network) in order to delay forwarded (routed) messages. Accordingly, the response latency between a source device and a destination device can be ascertained because it correlates with the sum of delays programmed into the routers that are participating in the message routing.

Figure 15:
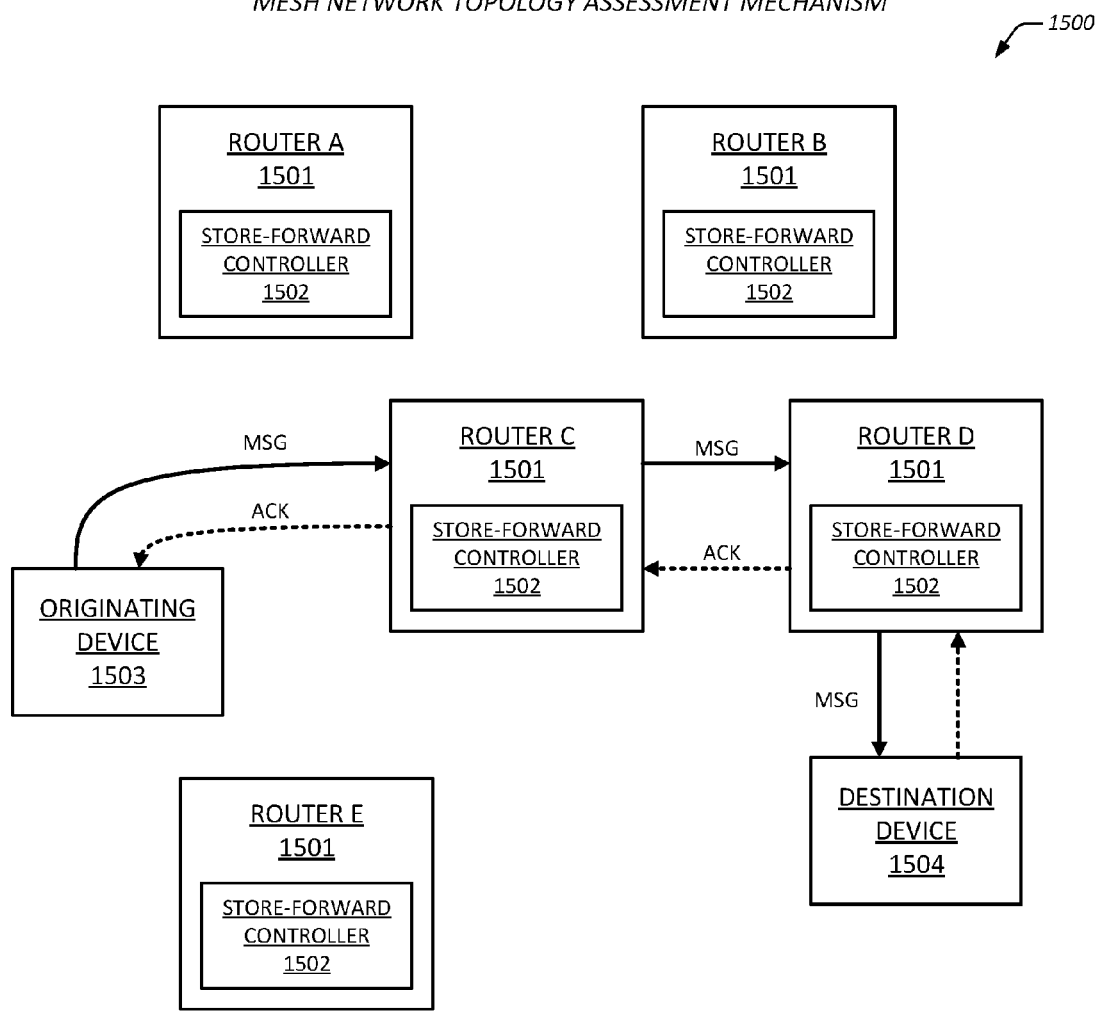
FIG. 15 is a block diagram showing a mesh network topology assessment mechanism according to the present invention.

Now referring to FIG. 15, a block diagram is presented showing a mesh network topology assessment mechanism 1500 according to the present invention. The assessment mechanism 1500 includes a plurality of routers 1506, each of which include a store-forward controller 1502. The mechanism 1500 also includes and originating device 1503 and a destination device 1504. Each of the store-forward controllers 1502 can be programmed with a unique routing delay.

In operation, once all of the routers 1501 are programmed with associated routing delays, the originating device 1503 transmits a message MSG to the destination device 1504. The message MSG is interpreted by the routers 1501 in the hop chain—in the diagram shown as ROUTER C 1501 and ROUTER D 1501—which each introduce the delay that is programmed into their respective store-forward controllers 1502, and the message MSG is delivered to the destination device 1504. The destination device responds with a link assessment acknowledge message ACK, which returns through the hop chain to the originating device 1503, where the store-forward controllers 1502 in the routers 1501 in the hop chain introduce the programmed delays into the propagation path of the ACK. In one embodiment, the return hop chain for the ACK may be different than the forward hop chain for the message MSG and the delays provided for by the store-forward controllers 1502 are uniquely selected such that it the propagation path and network topology can be clearly discerned from the cumulative round trip propagation time.

The routers 1501 according to the present invention are configured to perform the operations and functions as is described above. The routers 1501 comprise logic, circuits, devices, or microcode (i.e., micro instructions or native instructions), or a combination of logic, circuits, devices, or microcode, or equivalent elements that are employed to perform the operations and functions described above. The elements employed to perform these operations and functions may be shared with other circuits, microcode, etc., that are employed to perform other functions within the routers 1501.

Figure 16:
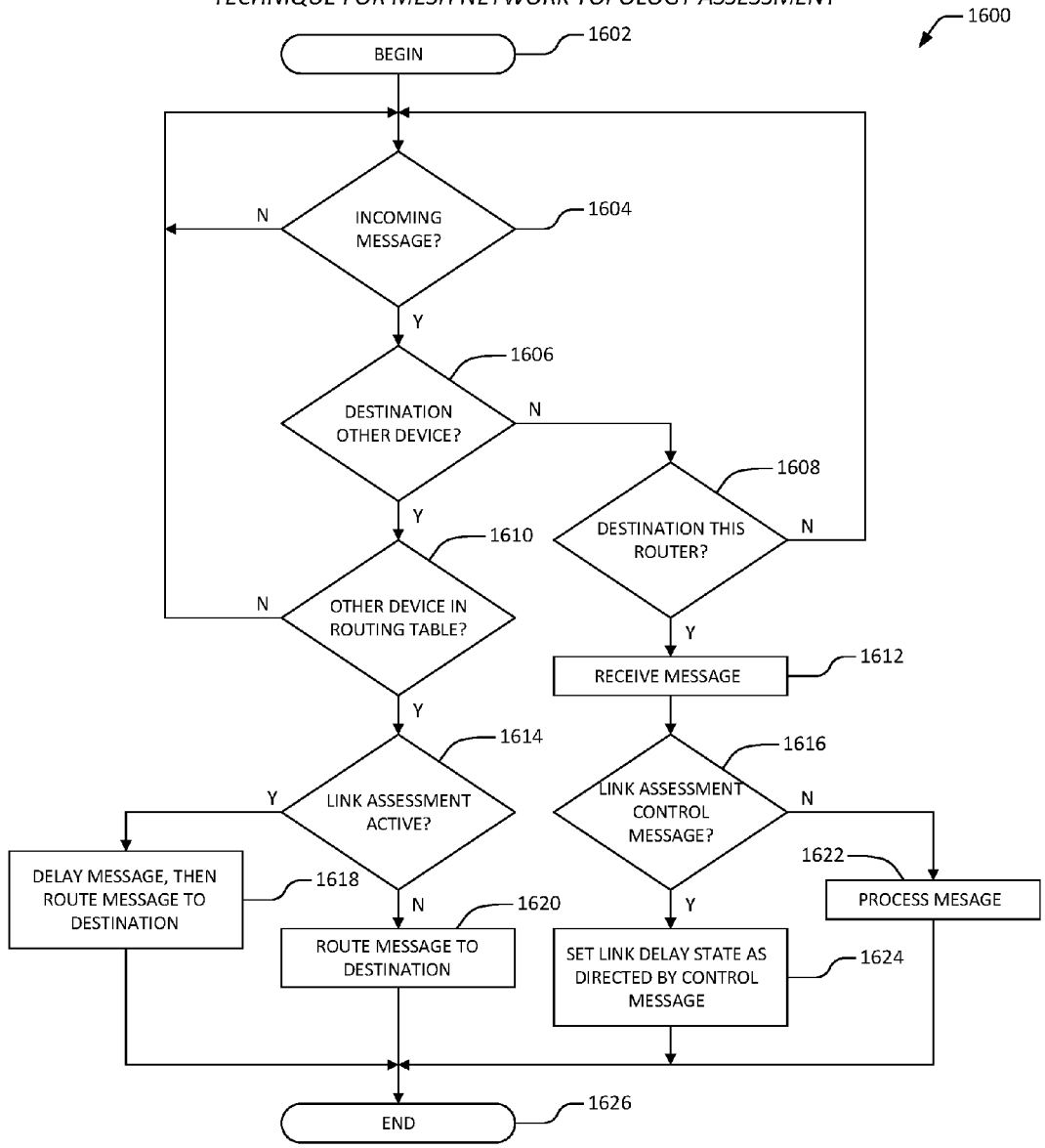
FIG. 16 is a flow diagram depicting a method employed by the mechanism of FIG. 15 to assess the topology of a mesh network.

Turning to FIG. 16, a flow diagram 1600 is presented depicting a method employed by the mechanism of FIG. 15 to assess the topology of a mesh network, as seen from the level of a particular router 1501. Flow begins at block 1602, where a network of routers 1501 according to the present invention are deployed with store-forward controllers 1502 having routing delays programmed therein. An originating device 1503 sends a message to a destination device 1504. Flow then proceeds to decision block 1604.

At decision block 1604, the router 1501 monitors for incoming messages. If there are none, then flow proceeds to decision block 1604. If an incoming message is detected, then flow proceeds to decision block 1606.

At decision block 1606, the message is parsed to determine if the message is destined for another device. If so, then flow proceeds to decision block 1610. If not, then flow proceeds to decision block 1608.

At decision block 1610, an evaluation is made to determine if the other device is in the instant router's routing table. If not, then flow proceeds to decision block 1604. If so, then flow proceeds to decision block 1614.

At decision block 1614, the router 1501 determines if a link assessment mode is active. If so, then flow proceeds to block 1618. If not, then flow proceeds to block 1620.

At block 1618, since link assessment is active, the router 1501 delays the message by the programmed delay time, and then forwards the message to the next hop towards the destination device 1504. Flow then proceeds to block 1626.

At block 1620, since link assessment is not active, the router 1501 forwards the message to the next hop towards the destination device 1504. Flow then proceeds to block 1626.

At decision block 1608, it is determined if the destination of the message is the instant router 1501. If not, then flow proceeds to decision block 1604. If so, then flow proceeds to block 1612.

At block 1612, the message is received by the instant router and parsed. Flow then proceeds to decision block 1616.

At decision block 1616, it is determined if the message is a link assessment control message. If not, then flow proceeds to block 1622. If so, then flow proceeds to block 1624.

At block 1622, the message is processed. Flow then proceeds to block 1626.

At block 1624, the link assessment state and corresponding link delay are set in the store-forward controller 1502 as directed by the link assessment control message. Flow then proceeds to block 1626.

At block 1626, the method completes.

As one skilled in the art will appreciate, a present day low power wireless network overcomes the power and range limitations of low power devices by allowing the messages to "hop," that is to be retransmitted by multiple intermediary devices in order to deliver a message to a distant recipient. And most assessments of transmission quality still utilize a signal strength indication for each individual hop, which does not necessarily correlate to the quality of all hops necessary to transport the messages from source to destination. The present inventors have further observed that it is not only desirable to understand the topology and communication behavior of a mesh network, such a the network discussed with reference to FIGS. 3-8 and 16-17, but it is also advantageous to understand end-to-end link quality of the network, similar to that presently provided for in a conventional hop-to-hop received signal strength indication (RSSI). Accordingly, one aspect of the present invention contemplates a mechanism for creating a more composite end-to-end link quality indication by aggregating the per-hop signal strength indications (RSSI) into a single term that may be used to support network decisions that are based on complete round-trip transmissions in a multi-hop network. Advantageously, the present invention improves the ability of system designers and devices to understand the true end-to-end quality of a message transmitted in a multi-hop network. By aggregating the per-hop RSSI value typically stored at each device into a single value representative of the total round-trip quality of the message and subsequent acknowledgment, a more accurate assessment can be made of the propagation of messages in a network. This technique results in improved operation, improved diagnostics capability, and reduced installation/configuration costs.

Figure 17:
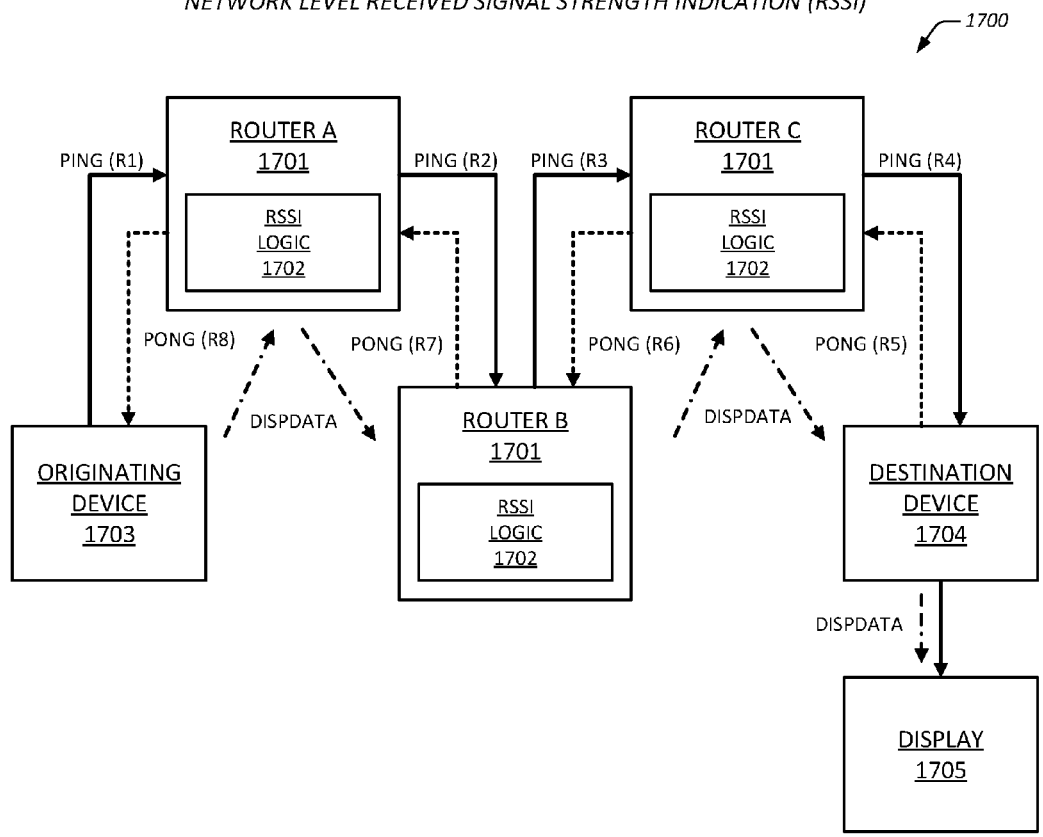
FIG. 17 is a block diagram illustrating a technique according to the present invention for determining a network level received signal strength indication (RSSI)

Turning now to FIG. 17, a block diagram 1700 is presented illustrating a technique according to the present invention for determining a network level received signal strength indication (RSSI). The diagram 1700 depicts a plurality of wireless routers 1701 deployed within the network. Each of the routers 1701 includes RSSI logic 1702. An originating device 1703 is wirelessly coupled to Router A 1701 and a destination device 1704 is wirelessly coupled to Router C 1701. A display is 1705 is coupled to the destination device 1704.

In operation, the originating device 1703 starts a process of testing the end-to-end link quality of the multi-hop network and by sending messages to the destination device 1704, and the display 1705 is employed to indicate an aggregated end-to-end RSSI value. A plurality of ping messages PING and pong messages PONG are sent through the network in order to determine the end-to-end RSSI value. The originating device 1703 sends a ping message PING, and each intermediary device 1701 in the network receives the message, adds RSSI information to a corresponding field R1-R4 of the message PING, and forwards the message PING to the destination device 1704. The destination device 1704 receives the message PING and returns a pong response message PONG. The response PONG is propagated through the network, where each intermediary device 1701 continues to add RSSI information R5-R8. When the pong message PONG is received by the originating device 1703, the RSSI information R1-R8 is examined, a composite end-to-end RSSI value is generated by the originating device 1703, and this composite value is included in a message DISPDATA to the destination device 1704. The composite RSSI value is transmitted to the display 1705 to facilitate installation of the destination device 1705 in a location with adequate end-to-end signal quality. One embodiment of the present invention contemplates single end-to-end RSSI value to indicate end-to-end link quality. Another embodiments consider use of the same mechanism to represent link quality in a different or more complex way, such as by displaying both the number of hops in a network as well as a forward link (i.e., PING) RSSI end-to-end RSSI value and a reverse link (i.e., PONG) end-to-end RSSI value. In one embodiment, individual hop-to-hop RSSI values R1-R8 are indicated as a range of signal strength from 0-255, and the composite RSSI value generated by the originating device 1703 is the average of the hop-to-hop values. An alternative embodiment contemplates generation of the composite RSSI value as a weighted average of the individual hop values, where the weights for each hop are determined based upon system performance and/or cost criteria.

While the low cost mechanism for receiving and transporting real time energy data described above with reference to FIGS. 9-12 enables the allocation of receiver resources to optimally cover a plurality of AMR meters having an unknown hopping sequence, it is noted that such allocation does not precisely detect each adjacent frequency hop that is taken by an individual AMR meter, but rather takes into account that the same data is transmitted by the individual AMR meter at the different frequency hops according to an unknown hop algorithm. Accordingly, the receiver resources are assigned to best utilize a plurality of receivers that are set to different frequency bands. And while such a technique is useful for reading of AMR meters where the same data is transmitted on each of a plurality of frequency hops, the present inventors have noted that it may be desirable to ascertain a specific frequency hopping sequence employed by frequency hopping devices. They have further observed that by utilizing a systematic approach to examining frequencies and transmissions that are employed by a hopping network, the specific frequency hopping sequence can be determined for those networks whose hopping algorithm is a linear function of time. Since the time between hops is deterministic, it is possible to examine sets of channels to identify "adjacent channels" in the hopping list. By examining the sets of channels over time, the adjacent channels are identified and the entire list is correlated, thereby yielding the specific frequency hopping sequence.

Accordingly, the present invention provides for the determination of the specific frequency hopping sequence for a frequency hopping network or device without prior knowledge of the algorithm and/or sequence. The present invention may be employed as part of a network of devices that receive AMR meter broadcasts and forward the real time meter energy readings to a facility, such as a utility or NOC, thus creating a "smart meter" network from pre-existing AMR meters.

Those skilled in the art will appreciate that a hopping sequence may be determined through the use of costly broadband multi-channel radios, by sequentially scanning a list of frequencies, or by employing other brute-force methods. In contrast, the present invention contemplates determining a hop sequence by progressively selecting channel candidates based on latency of messages observed between channels. For instance, in a network where the hop rate is fixed, it follows then that the latency of messages being transmitted across multiple hops should be at a minimum between two channels adjacent to each other in the hopping sequence. Stated differently, two channels are selected, and the latency of messages occurring between the two channels is measured. If the latency measured is that of the fixed hop rate, then those two channels are considered adjacent, with the later message arriving at the latest channel in the list. By progressively monitoring two channels in a list of channels, a sequence list can be built that describes the hopping sequence of the network.

Figure 18:
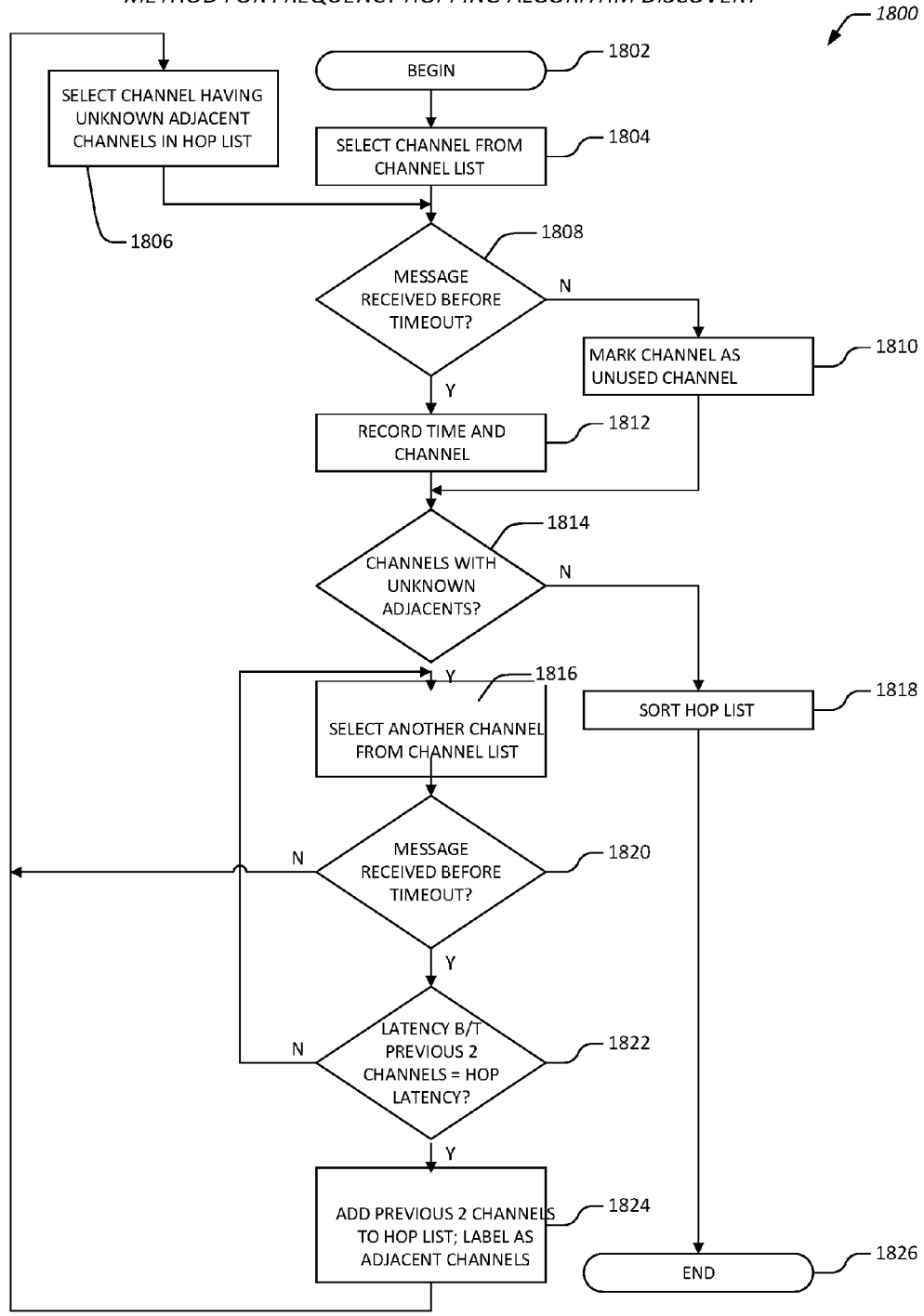
FIG. 18 is a flow diagram depicting a method according to the present invention for discovering the frequency hopping sequence corresponding to a network of devices.

Referring to FIG. 18, a flow diagram 1800 is presented depicting a method according to the present invention for discovering the frequency hopping sequence corresponding to a network of devices. Flow begins at block 1802 where a tunable receiver is deployed to receive messages transmitted by devices in the network. Flow then proceeds to block 1804.

At block 1804, a channel is selected from a channel list and the receiver is tuned to the selected channel. Flow then proceeds to decision block 1808.

At decision block 1808, the receiver determines if a message on the selected channel has been received before a timeout corresponding to a predicted hop interval. If so then flow proceeds to block 1812. If not then flow proceeds to block 1810.

At block 1810, the selected channel is marked as an unknown channel and flow proceeds to decision block 1814.

At block 1812, the selected channel is recorded as a used channel and the time of reception of determined in decision block 1808 is recorded. Flow then proceeds to decision block 1814.

At decision block 1814, the receiver performs an evaluation to determine if there are any channels remaining in the channel list that have unknown adjacent channels. If not, then flow proceeds to block 1826. If so, then flow proceeds to block 1816.

At block 1816, the receiver selects another channel from the channel list. Flow then proceeds to block 1820.

At block 1820, the receiver determines if a message on the selected other channel has been received before a timeout corresponding to a predicted hop interval. If so then flow proceeds to decision block 1822. If not then flow proceeds to block 1816.

At decision block 1822, the receiver determines if the latency between the previous two channel transmissions is equal to the expected hop interval. If not then flow proceeds to block 1816. If so, then flow proceeds to block 1824.

At block 1824, the two previous channels are added to a hop list and flow proceeds to block 1806.

At block 1806, a channel with unknown adjacent channels in the hop list is selected and flow proceeds to decision block 1808.

At block 1826, the method completes.

The present inventors have further observed that in many wireless networks it may be necessary to transmit very large payloads to devices within the network, thus resulting in burdensome traffic. Consider one example of a large payload, in the case where, say, a software update must be sent to all of the devices within the network. As one skilled in the art will appreciate, virtually all present day wireless protocols today require fragmentation of a large payload into a series of smaller payloads that can each be transmitted in a single packet. The present inventors have noted, though, for devices that are able to utilize multiple simultaneous bands or channels to receive messages, such as the devices discussed above with reference to FIGS. 3-18, it may be desirable to fragment a large payload and to simultaneously transmit fragments of the payload over different bands. One embodiment of the present invention comprehends a technique for fragmenting ("segmenting") a large payload such that a first band/channel transmits the fragments of the payload sequentially starting from a first fragment and ending at a last fragment. Simultaneously on a second band/channel, the same entire payload is transmitted in reverse order, starting at the last fragment and ending at the first fragment. A receiving device monitors the fragments that are received on the first and second bands/channels, and when the fragments overlap (i.e., the same fragment is received by over both the first and second bands/channels, the receiving device considers the complete payload as having been received, and reassembles the entire payload from the received fragments. Advantageously, the total time required to transmit a large payload is reduce and band/channel utilization improves. In one embodiment, since different frequency bands may utilize different transmission rates, packet sizes, and energy requirements, payload fragmentation can be optimized to provide the transmission of the complete payload in a minimum time. Another embodiment contemplates fragmentation that is optimized to minimize required amount of energy consumed to transfer the entire payload. A further embodiment comprehends transmitting and receiving devices having more than two bands/channels, where fragmentation of the entire message is executed to accomplish overlap (i.e., complete reception) based upon minimum time, minimum energy, or other factors such as hop cost.

Figure 19:
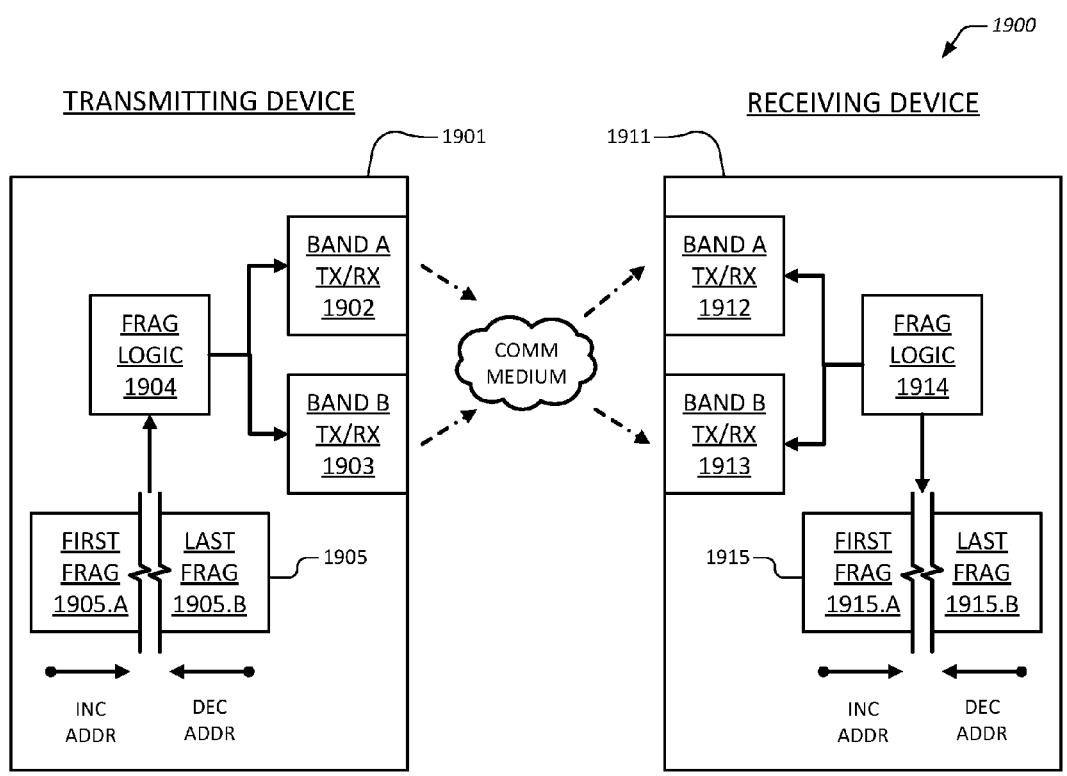
FIG. 19 is a block diagram featuring an apparatus according to the present invention for simultaneously fragmenting and transmitting large packet payloads.

FIG. 19 is a block diagram 1900 featuring an apparatus according to the present invention for simultaneously fragmenting and transmitting large packet payloads. The diagram shows a transmitting device 1901 and a receiving device 1911. Each of the devices 1901, 1911 include a first transceiver 1902, 1912 that transmits and receives data over a first band/channel, and a second transceiver 1903, 1913 that transmits and receives data over a second band/channel. Each of the devices 1901, 1911 also include fragmentation logic 1904, 1914 that is coupled to the first and second transceivers 1902, 1912, 1903, 1913, respectively. Also shown is a large payload 1905, 1915 that is to be transmitted and received as described above.

In operation, for transmission, fragmentation logic 1904 in the transmitting device 1901 provides the large payload 1905 to the first transceiver 1902 such that the first transceiver 1902 transmits the fragments 1905.A-1905.B of the payload sequentially starting from a first fragment 1905.A and ending at a last fragment 1905.B. Simultaneously, fragmentation logic 1904 in the transmitting device 1901 provides the large payload 1905 to the second transceiver 1903 such that the second transceiver 1903 transmits the fragments 1905.A-1905.B of the payload sequentially starting from the last fragment 1905.B and ending at the first fragment 1905.A.

Transmissions are received by the first and second transceivers 1912, 1913 in the receiving device 1911 and the fragmentation logic 1914 in the receiving device 1911 reassembles the large payload 1915 as sequentially increasing segments are received by the first transceiver 1912 and as sequentially decreasing segments are received by the second transceiver 1913. When received segments overlap, the fragmentation logic 1914 considers the large payload 1915 as having been received and may direct the receiving device 1911 to take other actions (such as sending a large payload early termination acknowledgement message) as the host protocol allows.

It is noted that the grid management system described above with reference to FIGS. 3-8 includes a network of devices which are employed to provide for automatic meter reading (AMR) and to control a home area network (HAN) for the control and monitoring of various devices and appliances within a facility. Furthermore, embodiments of the network of devices are disclosed where communications between the devices is accomplished over a wireless mesh network, including those comporting with IEEE 802.15.4 and IEEE 802.11 protocols. Yet, the present inventors have observed that while the IEEE 802.15.4 and IEEE 802.11 protocol specifications define multiple frequency bands, and the characteristics for signaling in those bands, there are no defined mechanisms for dynamic band selection. Additionally the present inventors note that many standards, such as those describing ZIGBEE® and IEC 62591 (also known as WirelessHART®) protocols, discuss proposed mechanisms for utilizing multiple channels within a band, but they do not prescribe techniques for dynamically selecting frequency bands on a per-packet basis, where the packets may have varying communication characteristics such as bit rate, packet size, range, and power efficiency. In networks comprising devices that are able to communicate across multiple bands, the present inventors have observed that it is advantageous to dynamically select and utilize multiple frequency bands for communication in order to improve communication propagation characteristics, message delivery reliability, and immunity from interference. Accordingly, one aspect of the present invention contemplates the use of acknowledgement (ACK) response metrics to dynamically select appropriate frequencies and bands in a multi-band communications network. In addition to dynamic selection of frequencies and bands, another aspect of the present invention may utilize ACK response metrics from other communications mediums over those associated with wireless communications to further improve the characteristics of the communication between a network of devices.

Figure 20:
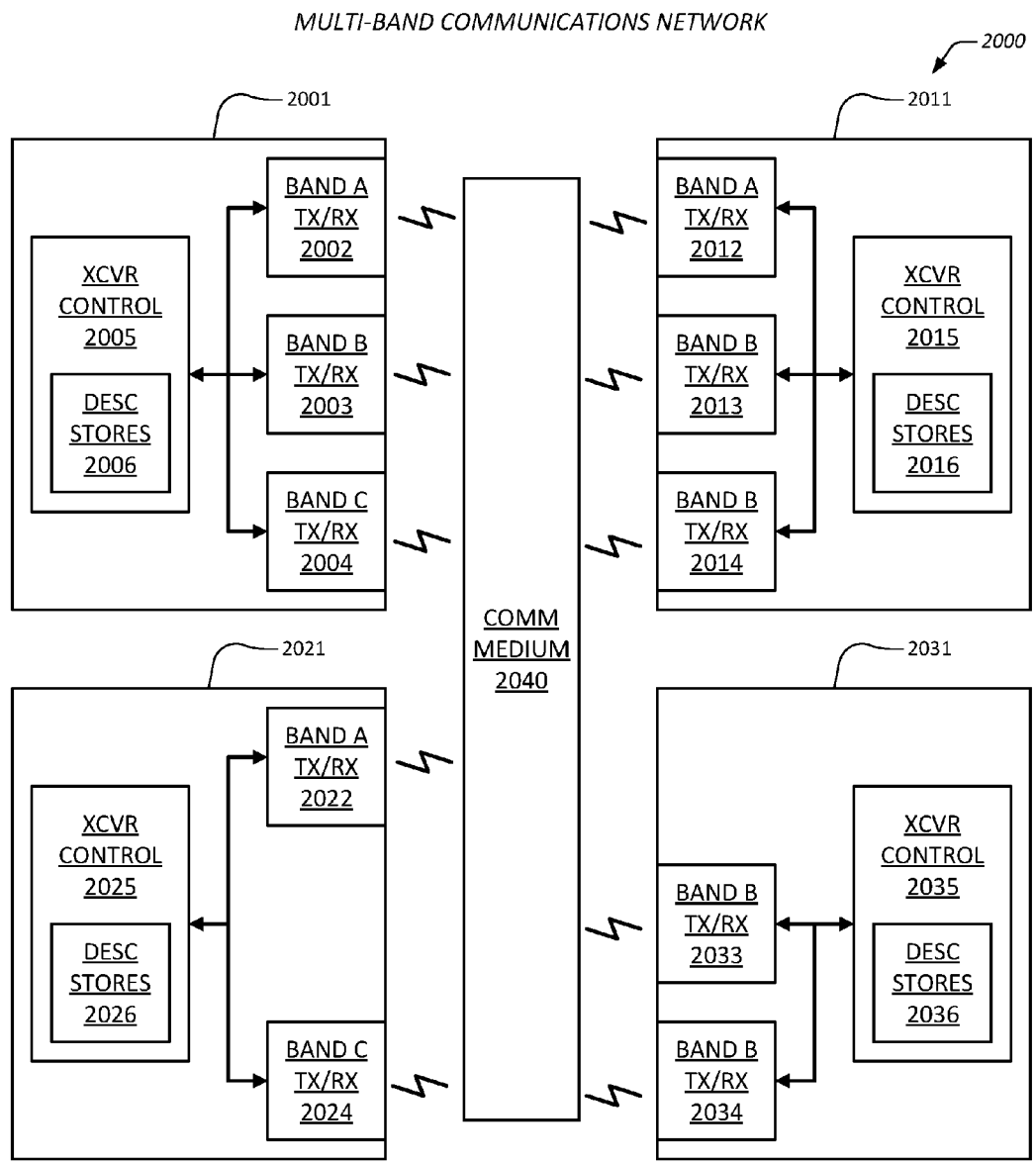
FIG. 20 is a block diagram showing a multi-band communications network according to the present invention.

Referring to FIG. 20, a block diagram 2000 is presented illustrating a multi-band communication network according to the present invention. The network includes a plurality of multi-band devices 2001, 2011, 2021, 2031 that communicate wirelessly over communications mediums 2040 having variable characteristics such as throughput, reliability, efficiency, etc. Each of the devices 2001, 2011, 2021, 2031 in the network has one or more communication transceivers 2002-2004, 2012-2013, 2022, 2024, 2033, 2034, where each transceiver 2002-2004, 2012-2013, 2022, 2024, 2033, 2034 has the capability to communicate with other devices 2001, 2011, 2021, 2031 having the same band capabilities. It is noted that the example of FIG. 20 portrays a network as a group of devices 2001, 2011, 2021, 2031 that communicate utilizing any and all frequencies, bands, and mediums available which are enabled by their respective transceivers 2002-2004, 2012-2013, 2022, 2024, 2033, 2034. In order for an originating device 2001, 2011, 2021, 2031 to propagate a message to a destination device 2001, 2011, 2021, 2031, the originating device 2001, 2011, 2021, 2031 must choose a transceiver 2002-2004, 2012-2013, 2022, 2024, 2033, 2034 that is available on the destination device 2002-2004, 2012-2013, 2022, 2024, 2033, 2034. Accordingly, the present inventors note that the present invention does not require all devices 2001, 2011, 2021, 2031 on a network to have the same number or type of transceivers 2002-2004, 2012-2013, 2022, 2024, 2033, 2034. As shown in FIG. 20, the four illustrated devices 2001, 2011, 2021, 2031 comprise one communication network. In this example, in order to propagate a message between two devices 2001, 2011, 2021, 2031 over the network, the originating device 2001, 2011, 2021, 2031 must choose a transceiver 2002-2004, 2012-2013, 2022, 2024, 2033, 2034 that is known to exist on the destination device 2001, 2011, 2021, 2031. For example, a first device 2001 and a second device 2011 can communicate using the band A, B, or C transceivers 2002-2004, 2012-2014, while the first device 2001 and a third device 2021 can communicate using the band A and C transceivers 2002, 2022, 2004, 2024, since the third device 2021 does not include a band B transceiver 2003. In order for the first device 2001 to send a message to the third device 2021, it must choose the most appropriate transceiver, either band A 2002 or band C 2004.

Figure 21:
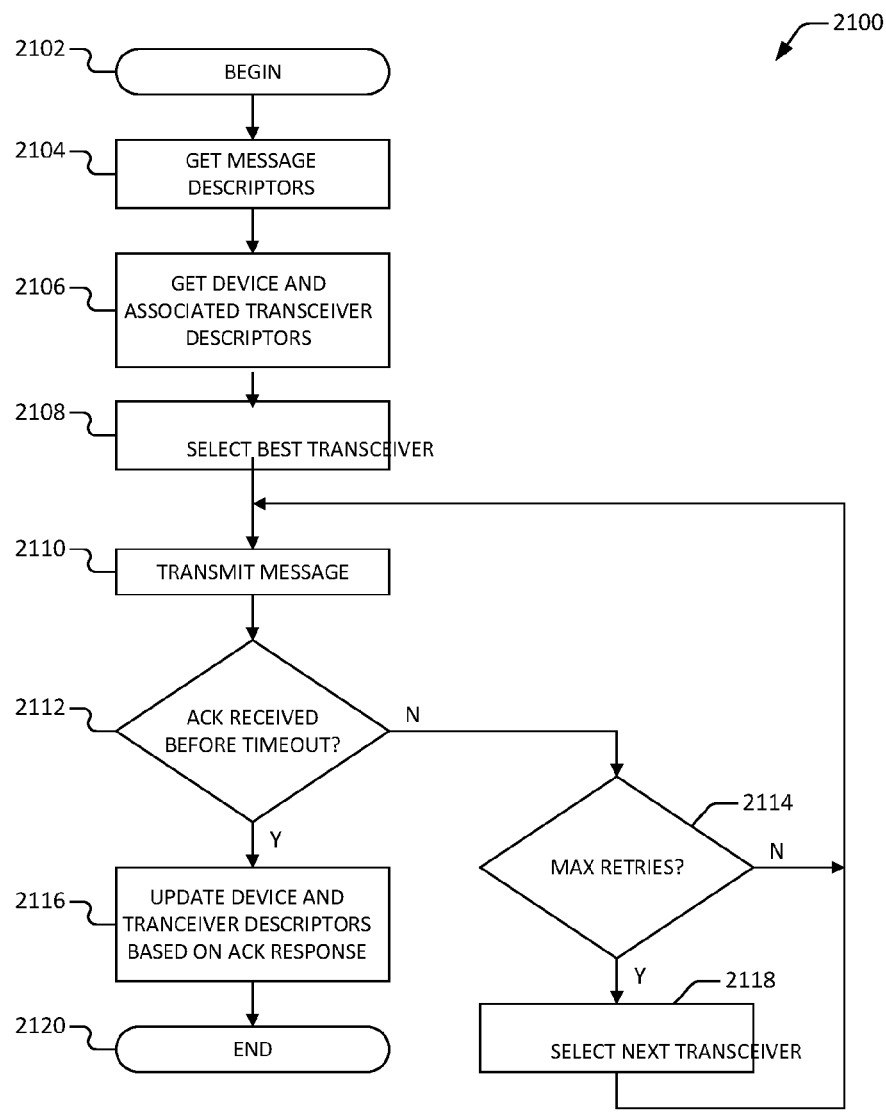
FIG. 21 is a flow diagram illustrating a method employed by the network of FIG. 20 to select transceivers for the transmission of messages.

Now turning to FIG. 21, a flow diagram 2100 is presented highlighting an exemplary method according to the present invention. Suppose that one device is required to send a message to another device. Accordingly, the flow diagram 2100 details the process of selecting the proper transceiver to accomplish the transmission. The one device utilizes message descriptors (i.e., a set of defined metrics that describe the requirements for sending the message) to select a transceiver that best matches the those requirements. Upon receipt of an acknowledgment of that transmission, new ACK response descriptors would be used to update the transceiver and device descriptors such that a following message can select the best transceiver available for that transmission. Flow begins at block 2102 where a the one device is configured to send the message to the other device. Flow then proceeds to block 2104.

At block 2104, the first device access descriptor stores therein to obtain descriptors for the message. Flow then proceeds to block 2106.

At block 2106, the one device accesses the descriptor stores to obtain descriptors at the transceiver and device level. Flow then proceeds to block 2108.

At block 2108, the one device selects a transceiver to send the message to the other device based upon data obtained from the descriptor stores accessed at blocks 2104 and 2106. Flow then proceeds to block 2110.

At block 2110, the one device transmits the message over the selected transceiver. Flow then proceeds to decision block 2112.

At decision block 2112, the one device determines if an acknowledge ACK is received before a timeout for retransmission has expired. If so, then flow proceeds to block 2116. If not, then flow proceeds to decision block 2114.

At decision block 2114, the one device determines if a maximum number of retries has occurred. If so, then flow proceeds to block 2118. If not, the flow proceeds to block 2110.

At block 2118, a next best transceiver is selected for transmission of the message, and flow proceeds to block 2110.

At block 2116, device and transceiver descriptors are updated in the descriptor store within the one device based upon the ACK response. Flow then proceeds to block 2120.

At block 2120, the method completes.

Figure 22:
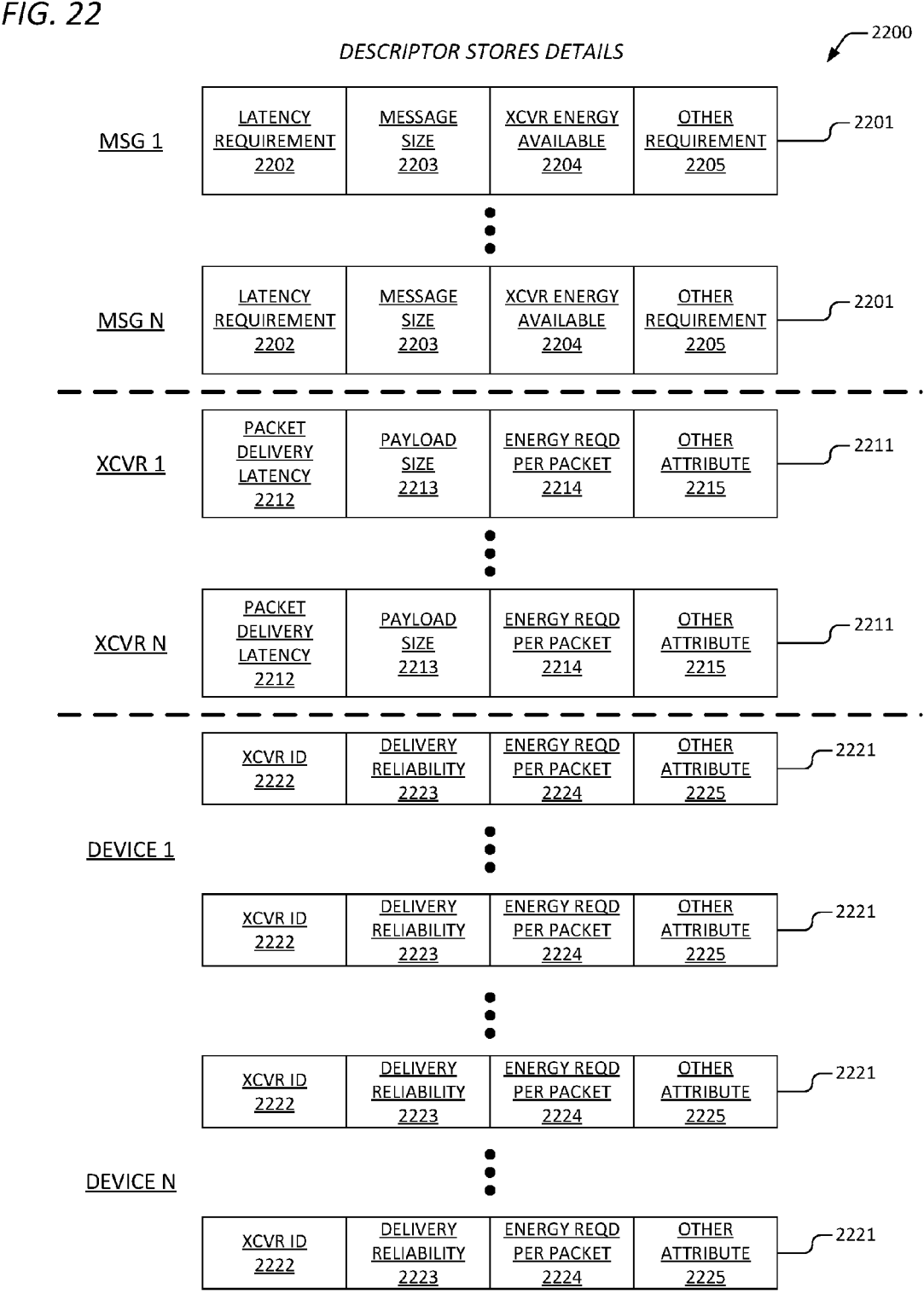
FIG. 22 is a block diagram detailing an exemplary descriptor stores such as may be employed in devices within the network of FIG. 20.

FIG. 22 is a block diagram detailing an exemplary descriptor stores 2200 within a device according to the present invention such as may be employed within the network of FIG. 20. The stores 2200 includes a plurality of message descriptors 2201 corresponding to a plurality of messages MSG 1-MSG N. The stores 2200 also includes a plurality of transceiver descriptors 2211 corresponding to a plurality of transceivers XCVR 1-XCV N within the device. The stores 2200 further include a plurality of device descriptors 2221 corresponding to a plurality of destination devices DEVICE 1-DEVICE N within the network.

The message descriptors 2201 include a latency requirement field 2202, a message size field 2203, a transceiver energy available field 2204, and an other requirement field.

The transceiver descriptors 2211 include a packet delivery latency field 2212, a payload size field 2213, an energy required per packet field 2214, and an other attribute field 2215.

The device descriptors 2211 each have one or more transceiver attribute descriptors corresponding to a destination device DEVICE 1-DEVICE N. Each of the transceiver attribute descriptors include a transceiver ID field 2222, a delivery reliability field 2223, an energy required per packet field 2224, and an other attribute field 2225.

In operation, by utilizing knowledge about the capabilities and operating characteristics of each medium, stored as a set of descriptors 2201, 2211, 2221, a device according to the present invention may select a transceiver (i.e., frequency band) that provides for optimal interoperation with respect to energy consumption, throughput, and reliability, thus eliminating the problems inherent in single-band networks, where interference from other devices and multipath interference (over a narrow range of frequencies in a band) reduce the reliability of the network.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A method for assessing a topology of a mesh network, comprising:

first coupling a plurality of first wireless routers together over a multi-hop mesh network;

second coupling a second wireless router to the plurality of first wireless routers over the multi-hop mesh network; and responsive to a message having a link assessment mode, via the second wireless router, introducing a unique delay into forwarding of the message to a next one of the plurality of first wireless routers in route to a destination device, wherein the second wireless router has a unique delay time corresponding to the unique delay, and wherein the unique delay time is substantial and thus provides for creation of measurable latency in the message sent between an origination device and the destination device, wherein the unique delay time is at least an order of magnitude greater than that introduced by message propagation and internal routing software, and wherein response latency between the origination device and the destination device is ascertained because the response latency correlates with a sum of delays programmed into the second wireless router and one or more of the plurality of first wireless routers that are participating in routing of the message.

2. The method as recited in claim 1, wherein the second wireless router is programmed with said unique delay time.

3. The method as recited in claim 1, wherein the delays selected such that a propagation path and a network topology are clearly discerned from a cumulative propagation time of the message.

4. The method as recited in claim 1, wherein the multi-hop mesh network comprises an IEEE 802.15.4 wireless network.

5. The method as recited in claim 1, wherein the multi-hop mesh network comprises an IEEE 802.11 wireless network.

* * * * *